US008427437B2

(12) United States Patent
Chae et al.

(10) Patent No.: US 8,427,437 B2
(45) Date of Patent: Apr. 23, 2013

(54) WIRELESS COMMUNICATION TERMINAL AND METHOD FOR DISPLAYING IMAGE DATA

(75) Inventors: Myung-joo Chae, Seoul (KR); Hyang Seok Chae, Seoul (KR); Jeongsik Mun, Seoul (KR)

(73) Assignee: LG Electronics Inc., Seoul (KR)

( * ) Notice: Subject to any disclaimer, the term of this patent is extended or adjusted under 35 U.S.C. 154(b) by 657 days.

(21) Appl. No.: 12/410,676

(22) Filed: Mar. 25, 2009

(65) Prior Publication Data

US 2010/0123669 A1 May 20, 2010

(30) Foreign Application Priority Data

Nov. 14, 2008 (KR) ........................ 10-2008-0113048

(51) Int. Cl.
*G06F 3/041* (2006.01)
(52) U.S. Cl.
USPC ........................................... 345/173; 715/716
(58) Field of Classification Search .................. 345/173, 345/175, 174, 649; 715/201, 716, 732, 773
See application file for complete search history.

(56) References Cited

U.S. PATENT DOCUMENTS

| 2003/0179234 | A1 | 9/2003 | Nelson et al. | |
| 2005/0267676 | A1* | 12/2005 | Nezu et al. | 701/200 |
| 2006/0001652 | A1* | 1/2006 | Chiu et al. | 345/173 |
| 2007/0222769 | A1* | 9/2007 | Otsuka et al. | 345/173 |
| 2008/0062141 | A1* | 3/2008 | Chandhri | 345/173 |
| 2008/0270886 | A1 | 10/2008 | Gossweiler et al. | |

FOREIGN PATENT DOCUMENTS

| EP | 1607850 | 12/2005 |
| JP | 2007-72233 | 3/2007 |

OTHER PUBLICATIONS

European Patent Office Application Serial No. 09160355.5, Search Report dated Feb. 25, 2013, 6 pages.

* cited by examiner

*Primary Examiner* — Joseph Haley
*Assistant Examiner* — Andrew Sasinowski
(74) *Attorney, Agent, or Firm* — Lee, Hong, Degerman, Kang & Waimey

(57) ABSTRACT

A wireless communication terminal is provided. The wireless communication terminal includes a display that includes a touch screen configured to recognize touch inputs; a memory configured to store image data; and a controller configured to communicate with the memory, the display, and the touch screen. The controller is further configured to display at least a portion of the image having a first scale in the display, wherein the controller defines a reference line associated with the displayed portion of the image and recognizes a first touch input to define a manipulation region associated with the reference line where a portion of the image in the manipulation region is gradually removed or reinstated in response to a movement of the first touch input relative to the reference line, while maintaining the same first scale of the image that is displayed outside of the manipulation region.

31 Claims, 19 Drawing Sheets

WIRELESS COMMUNICATION TERMINAL AND METHOD FOR DISPLAYING IMAGE DATA

CROSS-REFERENCE TO RELATED APPLICATIONS

Pursuant to 35 U.S.C. §119, this application claims the benefit of Korean Application No. 10-2008-0113048, filed on Nov. 14, 2008, the contents of which is hereby incorporated by reference herein in its entirety.

FIELD OF THE INVENTION

The present invention relates to mobile communication terminals, and particularly, to the functions of mobile communication terminals.

DESCRIPTION OF THE RELATED ART

The diversity in the functions available in modern wireless communication terminals, such as, personal computers, laptop computers, and cellular phones is rapidly expanding. For example, mobile terminals typically include a number of complicated functions, such as taking photos or videos, displaying music files or video files, playing games, and receiving broadcasts. Moreover, mobile terminals are being implemented as integrated multimedia devices.

Terminals can be divided into mobile terminals and stationary terminals. In general, the mobile terminals can be classified as handheld terminals or vehicle mounted terminals, where such classification may depend on the user's ability to transport the particular wireless communication terminal.

Various attempts have been made to implement complicated functions in such terminals by means of hardware and/or software. In particular, such terminals are being frequently used to display and manipulate image data, such as a map or other traffic related information.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the invention, a wireless communication terminal is provided. The wireless communication terminal includes a display comprising a touch screen configured to recognize touch inputs, a memory configured to store image data, and a controller configured to communicate with the memory, the display, and the touch screen. The controller is configured to display at least a portion of the image having a first scale in the display, wherein the controller defines a reference line associated with the displayed portion of the image and recognizes a first touch input to define a manipulation region associated with the reference line where a portion of the image in the manipulation region is gradually removed or reinstated in response to a movement of the first touch input relative to the reference line, while maintaining the same first scale of the image that is displayed outside of the manipulation region.

It is contemplated that the controller is further configured to display a contiguous portion of the image having the first scale while the image in the manipulation region is being removed. It is contemplated that the controller is further configured to recognize a second touch input to alter the image in the manipulation region in response to the movement of both the first and second touch inputs relative to the reference line.

It is contemplated that the manipulation region is determined by a user defined boundary. It is further contemplated that the user defined boundary comprises a rectangle.

It is contemplated that the manipulation region is not maintained depending on a first command provided by a user or a second command stored in the memory. It is contemplated that the image data comprises an image of a map.

It is contemplated that each of the touch inputs comprises either a proximity touch or a contact touch on the touch screen by a pointer. It is further contemplated that the pointer is a stylus or a finger of a user.

In one aspect of the invention, a wireless communication terminal is provided. The wireless communication terminal includes a display comprising a touch screen configured to recognize touch inputs, a memory configured to store image data, and a controller configured to communicate with the memory, the display, and the touch screen. The controller is further configured to display at least a portion of the image having a first scale in the display, wherein the controller defines a reference line associated with the displayed portion of the image and recognizes a first touch input to define a manipulation region associated with the reference line where a portion of the image in the manipulation region is gradually compressed or expanded in response to a movement of the first touch input relative to the reference line, while maintaining the same first scale of the image that is displayed outside of the manipulation region.

It is contemplated that the image in the manipulation region is removed in response to the close proximity of the first touch input with respect to the reference line. It is contemplated that the controller is further configured to display a contiguous portion of the image having the first scale while the image in the manipulation region is being compressed.

It is contemplated that the controller is further configured to recognize a second touch input to alter the image in the manipulation region in response to the movement of both the first and second touch inputs relative to the reference line. It is contemplated that the manipulation region is determined by a user defined boundary. It is further contemplated that the user defined boundary comprises a rectangle.

It is contemplated that the manipulation region is not maintained depending on a first command provided by a user or a second command stored in the memory. It is contemplated that the image data comprises an image of a map.

It is contemplated that each of the touch inputs comprises either a proximity touch or a contact touch on the touch screen by a pointer. It is further contemplated that the pointer is a stylus or a finger of a user.

In one aspect of the present invention, a method of displaying an image in a wireless communication terminal is provided. The method includes displaying at least a portion of the image having a first scale; defining a manipulation region in the portion of the image in response to a first touch input; and gradually removing or reinstating the portion of the image within the manipulation region in response a movement of the first touch input relative to a reference line. In the method, the first scale of the image outside the manipulation region is maintained.

It is contemplated that the method further includes displaying an indicator for indicating the reference line. It is contemplated that the method further includes storing a resulting image after gradually removing or reinstating the portion of the image within the manipulation region.

It is contemplated that the method further includes determining whether the removing of the portion of the image within the manipulation region is to be maintained and reinstating the portion of the image within the manipulation region based on the determination.

It is contemplated that the method further includes detecting a command for reinstating the portion of the image within the manipulation region and reinstating the portion of the image within the manipulation region depending on the determination.

In one aspect of the present invention, a method of displaying an image in a wireless communication terminal is provided. The method includes displaying at least a portion of the image having a first scale; defining a manipulation region in the portion of the image in response to a first touch input; and gradually compressing or expanding the portion of the image within the manipulation region in response a movement of the first touch input relative to a reference line. In the method, the first scale of the image outside the manipulation region is maintained.

It is contemplated that the method further includes displaying an indicator for indicating the reference line. It is contemplated that the method further includes storing a resulting image after gradually compressing or expanding the portion of the image within the manipulation region.

It is contemplated that the method further includes determining whether the compressing or expanding of the portion of the image within the manipulation region is to be maintained and expanding the portion of the image within the manipulation region based on the determination.

It is contemplated that the method further includes detecting a command for expanding the portion of the image within the manipulation region and expanding the portion of the image within the manipulation region depending on the detection.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
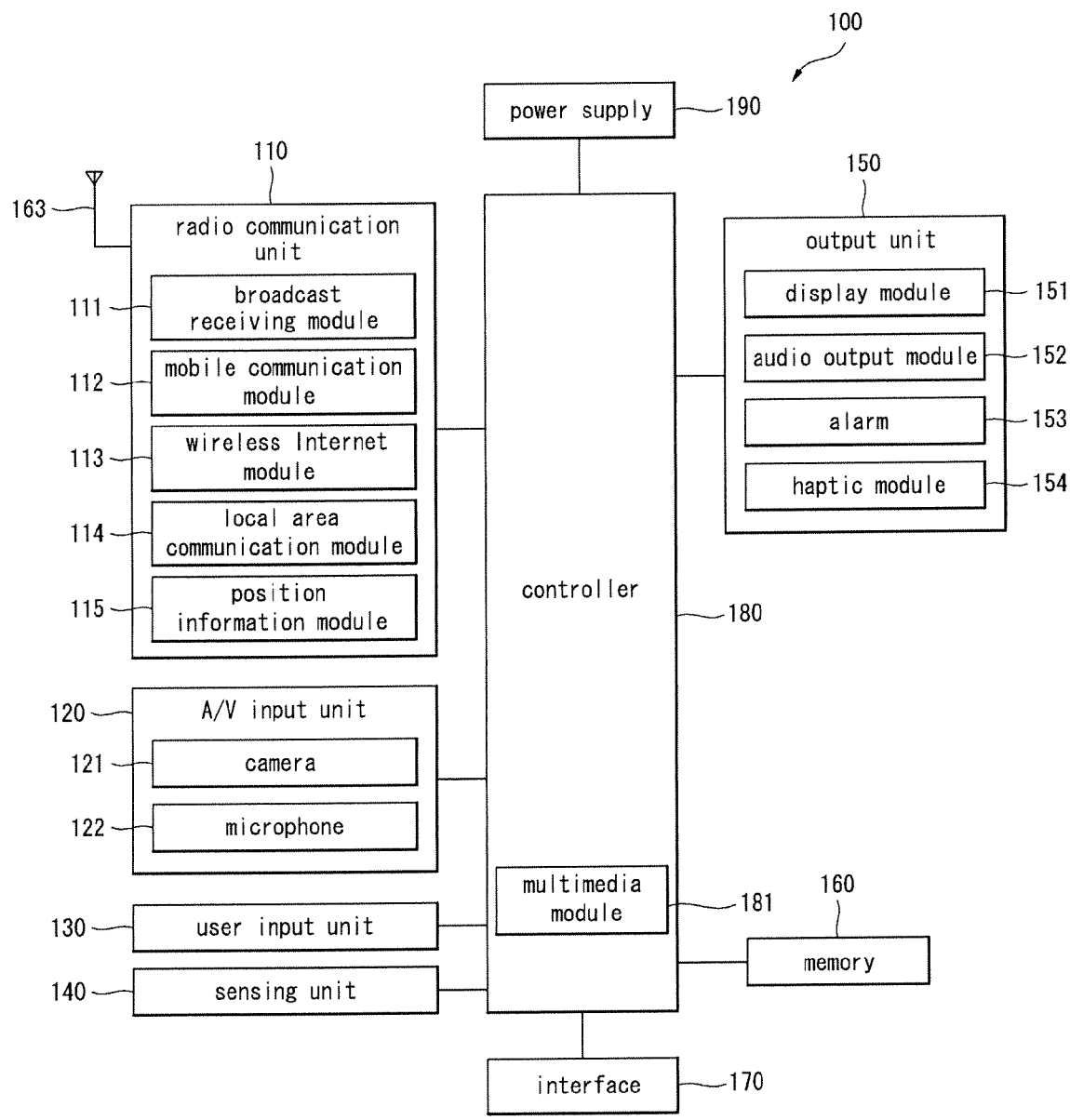
FIG. 1 is a block diagram of a mobile terminal in accordance with one embodiment of the present invention.

The present invention relates to mobile terminals. In the following detailed description, reference is made to the accompanying drawing figures which form a part hereof, and which show by way of illustration specific embodiments of the invention. Wherever possible, the same reference numerals will be used throughout the drawings to refer to the same or similar parts.

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

FIG. 1 is a block diagram of a mobile terminal 100 in accordance with one embodiment of the present invention. As shown in FIG. 1, the mobile terminal 100 includes a radio communication unit 110, an audio/video (A/V) input unit 120, a user input unit 130, a sensing unit 140, an output unit 150, a memory 160, an interface 170, a controller 180, and a power supply 190. It should be understood that mobile terminal 100 may include additional or fewer components than those shown in FIG. 1 without departing from the spirit and scope of the invention.

The radio communication unit 110 includes one or more modules for allowing radio communication between the mobile terminal 100 and a radio communication system or a network in which the mobile terminal 100 is located. For example, the radio communication unit 110 can include a broadcast receiving module 111, a mobile communication module 112, a wireless Internet module 113, a local area communication module 114, and a position information module 115.

The broadcast receiving module 111 receives broadcast signals and/or information associated with a broadcast from an external broadcast management server, or other network entity, via a broadcast channel. The broadcast channel can include a satellite channel and/or a terrestrial channel. The broadcast management server can be a server that generates and transmits a broadcast signal and/or information associated with a broadcast, or a server that receives a previously generated broadcast signal and/or information associated with a broadcast and transmits the broadcast signal and/or information associated with a broadcast to a terminal.

For example, the broadcast signal can comprise a television broadcast signal, a radio broadcast signal, or a data broadcast signal. The broadcast signal can further include a broadcast signal combined with a television or radio broadcast signal.

The broadcast associated information can be information on a broadcast channel, a broadcast program or a broadcast service provider. The broadcast associated information can be provided even through a mobile communication network. In this case, the broadcast associated information can be received by the mobile communication module 112.

The broadcast associated information can take various forms. For example, the broadcast associated information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive signals broadcast by various types of broadcast systems. In particular, the broadcast receiving module 111 can receive a digital broadcast by using a digital broadcast system, such as digital multimedia broadcasting-terrestrial (DMB-T), digital multimedia broadcasting-satellite (DMB-S), the data broadcasting system known as media forward link only (MediaFLO®), digital video broadcast-handheld (DVB-H), or integrated services digital broadcast-terrestrial (ISDB-T) systems. The broadcast receiving module 111 is configured to be suitable for every broadcast system that provides a broadcast signal as well as the above-mentioned digital broadcast systems.

Broadcast signals and/or broadcast-associated information received via the broadcast receiving module 111 can be stored in a storage medium, such as the memory 160.

The mobile communication module 112 transmits and/or receives radio signals to and/or from at least one of a base station, an external terminal (e.g., other user devices), or a server (or other network entities) in a mobile communication network. Such radio signals can include a voice call signal, a video telephony call signal, or various types of data according to text and/or multimedia message transmission and/or reception.

The wireless Internet module 113 supports wireless Internet access for the mobile terminal 100. For example, the wireless Internet module 113 can be internally or externally coupled to the mobile terminal 100. The wireless Internet technology implemented by the wireless Internet module 113 can be a wireless local area network (WLAN), Wi-Fi, Wireless Broadband (WiBro), World Interoperability for Microwave Access (WiMAX), or High-Speed Downlink Packet Access (HSDPA).

The local area communication module 114 is a module for supporting short range or local area communication. For example, the local area communication module 114 can be configured to communicate using short range communication technology, such as Bluetooth™, radio-frequency identification (RFID), Infrared Data Association (IrDA), Ultra-wideband (UWB), or ZigBee™.

The position information module 115 is a module for determining the position or location of the mobile terminal 100. For example, the position information module can include a global positioning system (GPS) module (not shown in FIG. 1). The GPS module can measure, for example, an accurate time and distance from at least three satellites and can accurately determine three-dimensional position information of the mobile terminal 100, such as latitude, longitude, and altitude information at a predetermined time. For example, a method of calculating position and time information by using three satellites and performing error correction on the calculated position and time information with another satellite can also be used. In addition, the GPS module can calculate velocity information by continuously calculating a current position in real time.

As shown in FIG. 1, the A/V input unit 120 in FIG. 1 can comprise an image capture device, such as a camera 121, and a device for detecting sounds, such as microphone 122. For example, the camera 121 can process image data of still pictures or video obtained via an image sensor of the camera 121 in a video telephony or photo capture mode of the mobile terminal 100. The processed image frames can be displayed on a visual output device, such as the display unit 151.

The image frames processed by the camera 121 can be stored in the memory 160 or other storage medium, or transmitted via the radio communication unit 110. Other embodiments of the mobile terminal 100 can include more than one camera 121.

The microphone 122 can receive sounds or audible data in a phone call mode, a recording mode, or a voice recognition mode, and can process such sounds into audio data. For example, when the mobile terminal 100 is in a phone call mode, the audio data can be appropriately converted using techniques known in the art for transmission to a mobile communication base station via the mobile communication module 112. The microphone 122 can include various types of noise canceling or suppression algorithms for removing any undesirable noise in the received sounds.

The user input unit 130 can be a user input device configured to generate key input data from commands entered by a user to control various operations of the mobile terminal 100. For example, the user input unit 130 can include a keypad, a dome switch, a jog wheel, a jog switch, and/or a touch sensor, such as a touch sensitive member that detects changes in resistance, pressure, voltage, or capacitance. The user input 130 can include, for example, a first user input 131 and a second user input 132, which are described below.

The sensing unit 140 can detect a current status or state of the mobile terminal 100, such as opened or closed state, the position of the mobile terminal 100, the absence or presence of user contact with the mobile terminal 100, the orientation of the mobile terminal 100, or an acceleration or deceleration of the mobile terminal 100. The sensing unit 140 can also generate commands or signals for controlling the operation of the mobile terminal 100.

For example, when the mobile terminal 100 is implemented as a slide type mobile phone, the sensing unit 140 may sense whether the phone is opened or closed. Furthermore, the sensing unit 140 can be configured to detect whether the power supply 190 supplies power and whether the interface 170 is connected to an external device. In one embodiment, the sensing unit 140 can include a proximity sensor.

The output unit 150 can include, for example, the display unit 151, an audio output module 152, an alarm 153, and a haptic module 154. The output unit 150 can be configured to generate a visual, an auditory, and/or a tactile output.

The display unit 151 can include a liquid crystal display (LCD), a thin film transistor liquid crystal display (TFT-LCD), an organic light-emitting diode (OLED) display, a flexible display, or a three-dimensional (3D) display.

The display unit 151 can display information processed in the mobile terminal 100. For example, when the mobile terminal 100 is in a phone call mode, the display unit 151 can display a user interface (UI) or a graphic user interface (GUI) associated with a telephone call or other communication. For example, the display unit 151 can display a previously stored message and/or a received image, or a UI or a GUI when the mobile terminal 100 is in the video telephony mode or the photographing mode.

In one embodiment, the display 151 can be configured as a transparent display, such as a transparent organic light emitting diode (TOLED) display or a transparent liquid crystal display. For example, the display unit 151 and/or the mobile terminal 100 can comprise translucent materials to allow a user to see through both the display unit 151 and the mobile terminal 100.

In other embodiments, the mobile terminal 100 can include one or more display units in addition to display unit 151. For example, the mobile terminal 100 can include both an external display unit and an internal display unit. The display units can be arranged, for example, on one side of the mobile terminal 100 at a predetermined location or on different sides of the mobile terminal 100.

When the display unit 151 and the touch sensor are overlaid in a layered manner to form a touch screen (also referred to herein as a touch screen 151), the display unit 151 can function both as an input device and an output device. For example, the touch sensor can comprise a touch film, a touch sheet, or a touch pad.

The touch sensor can be configured to convert a change in pressure or capacitance at a portion of the display unit 151 into an electric input signal. For example, the touch sensor can be configured to sense an amount of pressure applied by the touch as well as the location and area of touch.

When a touch input is applied to the touch sensor, a signal corresponding to the touch input is transmitted to a touch controller. The touch controller processes the signal and transmits data corresponding to the processed signal to the controller 180, thereby allowing the controller 180 to detect the touched portion of the display 151.

Referring to FIG. 1, the proximity sensor 141 can be located within the mobile terminal 100, within the abovementioned touch screen 151, or near the touch screen 151. The proximity sensor 141 is a sensor configured to sense the presence or absence of an object relative to a detection surface or an object located nearby. The proximity sensor 141 performs detection without physical contact by using the force of electromagnetism or infrared rays. The proximity sensor 141 has a longer life span than a contact type sensor, and can be used for various purposes.

The proximity sensor 141 can comprise, for example, a transmission type photo-electric sensor, a direct reflection type photo-electric sensor, a mirror-reflection type photo-electric sensor, a high-frequency oscillating proximity sensor, a capacitive proximity sensor, a magnetic proximity sensor, or an infrared proximity sensor. For example, a capacitive touch screen can be configured to detect the absence or presence of a pointer via a variation in an electric field caused by the proximity of the pointer to the capacitive touch screen.

For purposes of clarity, recognition of the location of the pointer when the pointer is positioned close to the touch screen 151 without actually contacting the touch screen 151 will be herein referred to as a "proximity touch," while recognition of the pointer when the pointer is actually in contact with the touch screen 151 will be herein referred to as a "contact touch." A proximity touch point on the touch screen 151 means a point of the touch screen 151 to which the pointer corresponds perpendicularly to the touch screen 151 when the pointer achieves a proximity-touch with the touch screen 151.

Via the proximity sensor 141, a proximity touch and a proximity touch pattern, such as a proximity touch distance, a proximity touch direction, a proximity touch speed, a proximity touch time, a proximity touch position, or a proximity touch movement state can be detected. For example, information corresponding to the detected proximity touch action and proximity touch pattern can be displayed on the touch screen 151.

The audio output module 152 can convert and output audio data received from the radio communication unit 110, or stored in the memory 160, in a call signal receiving mode, a call mode, a record mode, a speech recognition mode, or a broadcast receiving mode. The audio output module 152 may also provide audile outputs related to a particular function performed by the mobile terminal 100, such as a call signal reception sound or a message reception sound. For example, the audio output module 152 can include a receiver, a speaker, or a buzzer.

The alarm 153 may provide outputs to indicate the occurrence of an event in the mobile terminal 100. For example, the events can include call reception, message reception, a key signal input, or a touch input. In addition to video signals or audio signals, the alarm 153 can provide outputs in a different manner to indicate the occurrence of an event. For example, the alarm 153 can provide outputs in the form of vibrations, or other tactile or sensible outputs. The video and audio signals can be output via the display unit 151 and the audio output module 152.

The haptic module 154 generates various haptic effects that can be physically sensed by the user. For example, a haptic effect generated by the haptic module 154 can comprise a vibration. The intensity and pattern of the vibration generated by the haptic module 154 can be controlled. For example, different vibrations can be combined and provided or sequentially provided.

The haptic module 154 can generate a variety of haptic effects including a stimulation caused by an arrangement of vertically moving pins that are in contact with the skin of the user, and in particular with the face of the user; a stimulation caused by a jet force or a suction of air through a jet hole or a suction hole; a stimulation caused by rubbing of the user's skin; a stimulation caused by contact with an electrode; a stimulation cause by an electrostatic force; and a stimulation caused by the application of cold and warm temperatures using an element capable of absorbing or radiating heat in addition to vibrations.

The haptic module 154 can not only transmit haptic effects through direct contact but also allow the user to feel haptic effects via kinesthetic sense of her fingers or arms. For example, the mobile terminal 100 can include at least two haptic modules 154.

The memory 160 can store software programs that are used for the processing and operations performed by the controller 180, or data, such as a phone book, a message, a still image, or a video. The memory 160 can store data related to various patterns of vibrations and audio signals for output when a touch input is applied to the touch screen 151.

For example, the memory 160 can include at least one type of storage medium, such as a flash memory, a hard disk, a multimedia card, a micro type memory, a card type memory, such as a Secure Digital (SD) card, a random access memory (RAM), a static random access memory (SRAM), a read-only memory (ROM), a programmable ROM (PROM), an electrically erasable programmable read-only memory (EEPROM), magnetic memory, a magnetic disk, and an optical disk. In other embodiments, the memory 160 can be a network storage device that can be accessed by the mobile terminal 100 via a network connection.

The interface 170 in FIG. 1 can include, for example, a wired or wireless headset port, an external power supply port or a battery charger port, a wired or wireless data port, a memory card port, a port for connecting a device having a user identification module, an audio input/output (I/O) port, a video I/O port, and/or an earphone port.

The interface 170 serves as an interface via which at least one external device can be connected to the mobile terminal 100. The interface 170 can be used to receive inputs, such as data, and/or power from an external device and to transmit the data or power to one or more elements with in the mobile terminal 100. The interface 170 can also be used to transfer data between the mobile terminal 100 and an external device.

The identification module can be an element with memory or storage capabilities, such as a memory chip, configured to store various types of information for authenticating a user's authority to use the mobile terminal 100. For example, the identification module can include a user identify module (UIM), a subscriber identify module (SIM), and a universal subscriber identify module (USIM). For example, the identification module can be integrated into an identification device, such as a smart card. Accordingly, the identification device can be connected to the mobile terminal 100 via a port of the mobile terminal 100.

In addition, when the mobile terminal 100 is connected with an external cradle, the interface 170 can serve as a conduit to allow power from the cradle to be supplied to the mobile terminal 100, or can serve as a conduit to allow various command signals to be transmitted to the mobile terminal 100. Various command signals or power provided by the cradle can operate as a signal for recognizing when the mobile terminal is properly mounted on the cradle.

The controller 180 controls the general operations of the mobile terminal 100. For example, the controller 180 can be a microprocessor configured to perform control and processing associated with voice communication, data communication, and video telephony. The controller 180 can perform a pattern recognition processing to recognize a character or image from a handwriting input or a picture-drawing input performed on the touch screen 151.

The controller 180 can include a multimedia module 181 for reproducing or playing back multimedia data. The multimedia module 181 can be integrated into the controller 180 or may be external to the controller 180.

The power supply 190 receives external power, via a power cable connection, or internal power, via a battery of the mobile terminal. The power supply unit supplies power required for operating respective elements and components under the control of the controller 180.

The various components described herein can be implemented in a computer-readable medium using, for example, computer software, hardware, or any combination thereof.

For example, the components described herein can be implemented in hardware using an application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform the functions described herein. In other embodiments, such components can be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2A:
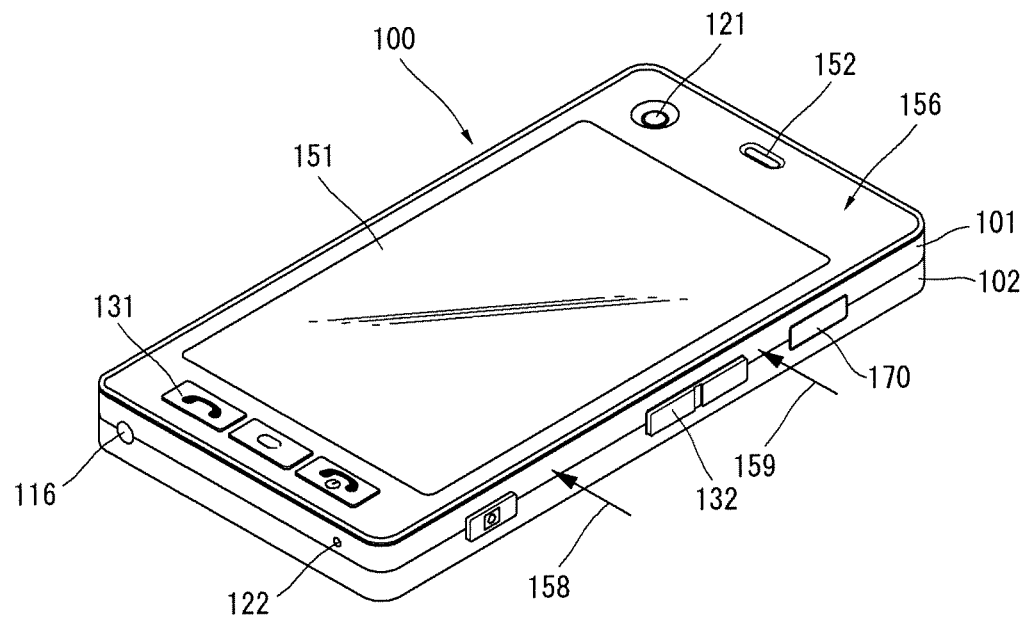
FIG. 2A is a front perspective view of the mobile terminal in accordance with one embodiment of the present invention.

FIG. 2A is a front perspective view of the mobile terminal 100 in accordance with one embodiment of the present invention.

In FIG. 2A, the mobile terminal 100 is shown to have a bar type body. However, it should be understood that the mobile terminal 100 is not limited to a bar type body and can have a body type comprised of at least two or more bodies that can move relative to one another, such as a slide type body, folder type body, swing type body, and a swivel type body.

The case of the mobile terminal 100, otherwise referred to as a "casing," "housing," or "cover," constituting the exterior of the mobile terminal 100, can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by plastic injection-molding or can be made of a metallic material, such as stainless steel (STS) or titanium (Ti).

The display unit 151, the audio output unit 152, the camera 121, the first user input unit 131, the second user input unit 132, the microphone 122, or the interface 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output unit 152 and the camera 121 can be arranged in proximity to one end of the display unit 151, and the first user input unit 131 and the microphone 122 can be located in proximity to another end of the display unit 151. As further shown in FIG. 2A, the second user input unit 132 and the interface 170 are arranged on the sides of the front case 101 and the rear case 102, such as sides 158 and 159, respectively.

The user input unit 130 (not shown in FIG. 2A) described above with respect to FIG. 1 can be configured to receive commands for controlling the operation of the mobile terminal 100 and can include one or more user inputs, such as the first user input 131 and the second user input 132 shown in FIG. 2A. The first user input unit 131 and the second user input unit 132 can each be referred to as a "manipulation unit." The manipulation unit can be configured to use various methods and techniques of tactile manipulation and response to facilitate operation by the user.

The first user input unit 131 and the second user input unit 132 can be configured to receive various inputs. For example, the first user input unit 131 can be configured to receive a start command, an end command, and a scroll command, and the second user input unit 132 can be configured to receive a volume control command for controlling the sound output from the audio output unit 152, or a mode change command to change the mode of the display unit 151 to a touch recognition mode.

Figure 2B:
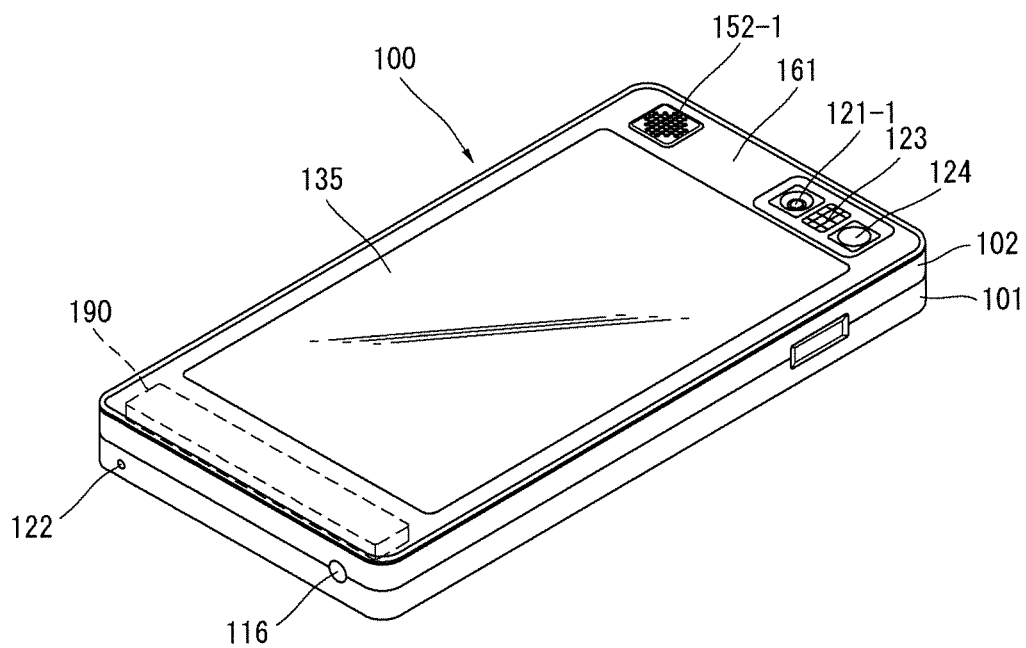
FIG. 2B is a rear perspective view of the mobile terminal in accordance with one embodiment of the present invention.

FIG. 2B is a rear perspective view of the mobile terminal 100 in accordance with one embodiment of the present invention.

As shown in FIG. 2A, a camera 121-1 or other image capture device can be located on a rear surface 161 of the rear case 102. The camera 121-1 has a direction of view that is substantially opposite to the direction of view of the camera 121 shown in FIG. 2A.

For example, if the camera 121 is positioned to view the front of the mobile terminal 100, then the camera 121-1 is positioned to view the rear of the mobile terminal 100. The cameras 121 and 121-1 can have different resolutions, that is, different pixels counts, with respect to one another.

For example, the camera 121 can operate with a relatively lower resolution than the camera 121-1 in order to capture an image of the user to allow immediate transmission of the image to another user in real-time for video telephony, whereas the camera 121-1 can operate with a relatively higher resolution than the camera 121 to capture images of general objects with high picture quality, which may not require immediate transmission in real-time, but may be stored for later viewing or use. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 is allows self-image capturing by allowing the user to see himself when the user desires to capture his own image using the camera 121-1.

The rear surface 161 of the rear case 102 can further include a second audio output unit 152-1. The second audio output unit 152-1 can support stereophonic sound functions in conjunction with the first audio output unit 152 shown in FIG. 2A and can be used for communication during a phone call when the mobile terminal 100 is in a speaker phone mode.

The broadcast receiving module 111 can include, for example, a broadcast signal receiving antenna (not shown in FIG. 2A) located at one side of the mobile terminal 100, in addition to antenna 163 shown in FIG. 1 used for mobile telephone communications. For example, the broadcast signal receiving antenna can be configured to be retractable from the mobile terminal 100.

FIG. 2B shows the power supply 190 for providing power to the handheld terminal 100. For example, the power supply 190 can be situated either inside the mobile terminal 100 or detachably coupled to an external portion of the mobile terminal 100.

As shown in FIG. 2B, a touch pad 135 for sensing a touch by the user can be located on the rear surface 161 of the rear case 102. In one embodiment, the touch pad 135 and the display unit 151 can be translucent. In such an embodiment, the information displayed on display unit 151 can be viewed through the touch pad 135. The information displayed on the display unit 151 and which can be viewed through the touch pad 135, can be controlled by the touch pad 135. In another embodiment, a display unit in addition to display unit 151 can be located on the rear surface 161 of the rear case 102 and combined with the touch pad 135 to form a touch screen 151 on the rear case 102.

In the embodiment shown in FIGS. 2A and 2B, the touch pad 135 located on the rear case 102 can be configured to allow manipulation by the user of items displayed on the display unit 151 located on the front case 101. For example, the touch pad 135 can be positioned substantially parallel to the display unit 151. For example, the touch pad 135 can have a size that is similar to a size of the display unit 151. In other embodiments, the touch pad 135 can have a different size relative to the display unit 151.

The interoperation between the display unit 151 and the touch pad 135 will now be described with reference to FIGS. 3A and 3B.

Figure 3A:
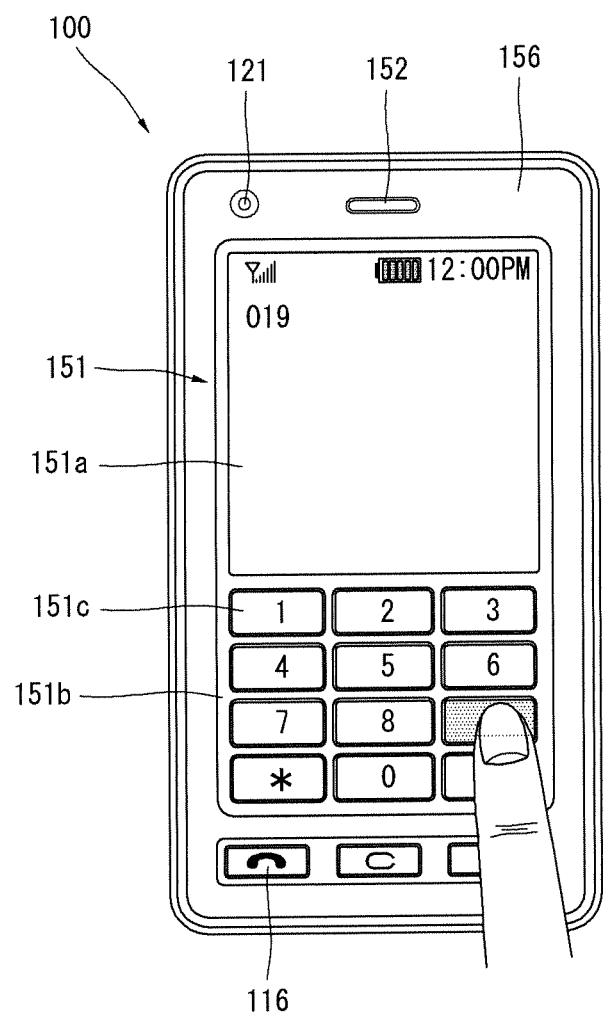
FIG. 3A is a front view of the mobile terminal in a portrait orientation in accordance with one embodiment of the present invention.

FIG. 3A shows a front view of the mobile terminal 100 in a portrait orientation in accordance with one embodiment of the present invention.

For example, the display unit 151 can be configured to display various types of information, such as characters, numerals, symbols, icons, and/or images. A user can input such information via a virtual keypad displaying an arrangement of at least a character, numeral, symbol, icon, or image on the display unit 151. Each key, such as key 151c, of the virtual keypad described above is also referred to in the art as a "soft key."

As shown in FIG. 3A, a user can input a character by touching a soft key on the display unit 151 located on the front surface 156 of the front case 101.

In one embodiment, the entire area of the display unit 151 can be configured to perform a single function. In other embodiments, two or more portions of the display unit 151 can be configured to perform different functions. In such an embodiment, the two or more portions of the display unit 151 can be configured to interoperate with one another.

For example, and as shown in FIG. 3A, an upper portion of the display unit 151 is configured as an output window 151a and a lower portion of the display unit 151 is configured as an input window 151b. As also shown in FIG. 3A, the input window 151b can display an arrangement of one or more soft keys, such as soft key 151c. For example, when a soft key in input window 151b is touched by a user, a character, number, or other input corresponding to the touched soft key can be displayed on the output window 151a.

As shown in FIG. 3A, for example, the soft keys in input window 151b can each represent a numeral which can be used by a user to input a telephone number. When the user operates the first input unit 131, for example, the mobile terminal 100 can attempt to place a call to the telephone number displayed on the output window 151a.

Figure 3B:
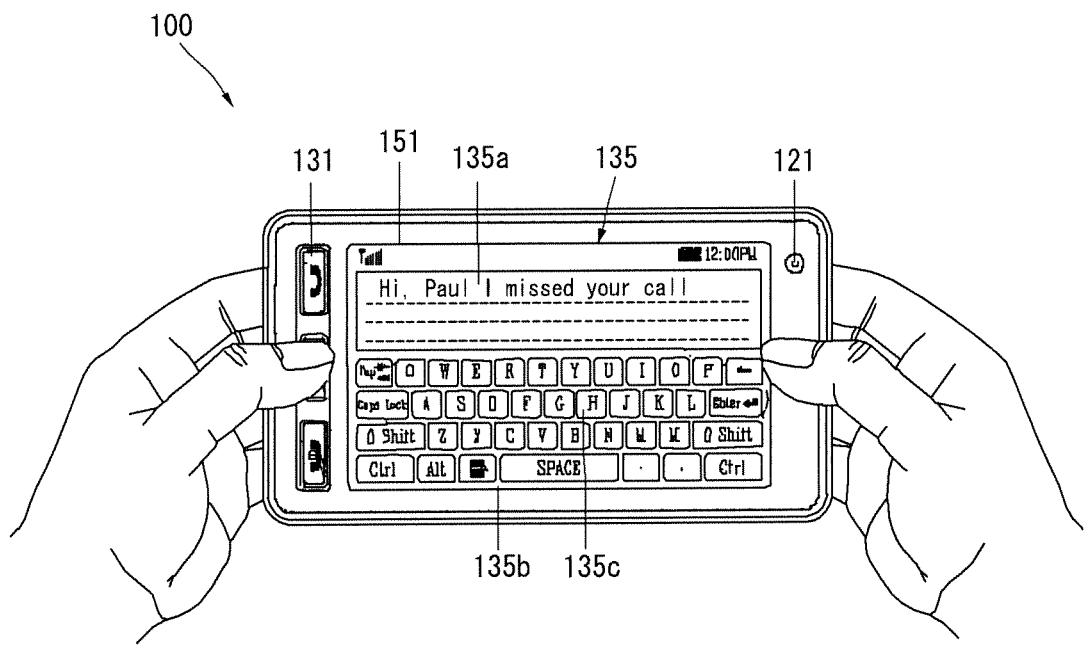
FIG. 3B is a front view of the mobile terminal in a landscape orientation in accordance with one embodiment of the present invention.

FIG. 3B shows a front view of the mobile terminal 100 in a landscape orientation in accordance with one embodiment of the present invention.

As shown in FIG. 3B, the mobile terminal 100 can be configured to convert the orientation of the displayed image in display unit 151 according to the current orientation of the mobile terminal 100.

As shown in FIG. 3B, the mobile terminal 100 can be configured to operate in a text input mode. As shown in FIG. 3B, the display unit 151 can display an output window 135a and an input window 135b. As further shown in FIG. 3B, one or more soft keys, such as soft key 135c, that corresponds to at least one of a character, symbol, or numeral can be arranged in the input window 135b. As further shown in FIG. 3B, the one or more soft keys can be arranged in a QWERTY configuration. Other embodiments of the mobile terminal 100 can include a different configuration of the one or more soft keys.

For example, when a user operates a soft key, such as soft key 135c, by touching the soft key via the touch pad 135 located at the rear of the mobile terminal 100, a character, numeral, or symbol corresponding to the touched soft key can be displayed on the output window 135a. It can be appreciated that by allowing a user to operate the soft keys via the touch pad 135 at the rear of the mobile terminal 100, the mobile terminal 100 prevents a user from obstructing a view of the soft keys displayed in input window 135b by the user's hands, thereby greatly improving the user's efficiency when inputting data. When the display unit 151 and the touch pad 135 are both translucent, the user can see his own fingers located behind the mobile terminal 100 through the display unit 151 and the touch pad 135, and thus can accurately guide his fingers to the desired soft keys to correctly and efficiently operate the soft keys.

In one embodiment, the display unit 151 or the touch pad 135 can be configured to operate a scroll command in response to a touch input by the user. For example, the user can scroll the display unit 151 or the touch pad 135 to move an object displayed in the display unit 151, such as a cursor or a pointer located on an icon. In another embodiment, when a user moves his finger across the display unit 151 or the touch pad 135, the path of the user's finger can be visually displayed on the display unit 151 to facilitate various operations and functions of the mobile terminal 100, such as image editing.

For example, in an embodiment where the display unit 151 is configured as a touch screen, if the display unit 151 and the touch pad 135 are simultaneously touched by the user for a predetermined period of time, such as when the user clamps the mobile terminal 100 between his thumb and index finger, a function of the mobile terminal 100 can be executed. For example, the function can be an activation or deactivation of the display unit 151 or the touch pad 135.

The proximity sensor 141 will now be described in greater detail with reference to FIG. 4.

Figure 4:
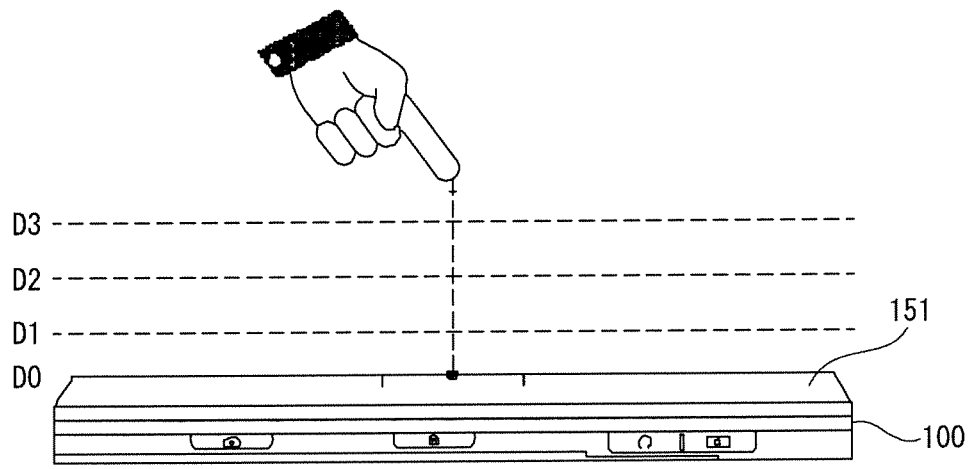
FIG. 4 is a side view of the mobile terminal in accordance with one embodiment of the present invention.

FIG. 4 shows a side view of the mobile terminal 100 in accordance with one embodiment of the present invention.

As shown in FIG. 4, when a pointer, such as a user's finger or stylus, approaches the touch screen 151, that is, display unit 151, the proximity sensor 141 located inside or near the touch screen 151 senses the approach of the pointer and provides a proximity signal.

The proximity sensor 141 can be configured to output a proximity signal indicating the distance between the pointer and the touch screen 151. Such a distance is also referred to in the art as a "proximity depth."

The distance at which the proximity signal is provided by the proximity sensor 141 when the pointer approaches the touch screen 151 is referred to as a detection distance. For example, the proximity depth can be determined by using a plurality of proximity sensors, such as proximity sensor 141, having various detection distances and by comparing the proximity signals provided by each corresponding proximity sensor.

The exemplary mobile terminal 100 shown in FIG. 4 is configured to detect three proximity depths, such as proximity depths D1, D2, and D3, where each proximity depth represents the distance from the touch screen 151 to a location above the touch screen 151 in a substantially perpendicular direction above the touch screen 151. The relationships between the proximity depths D0, D1, D2, and D3 can be expressed as: $D0<D1<D2<D3$. It should be understood that in other embodiments, the mobile terminal 100 can be configured to include less than or greater than three proximity sensors to enable detection of any number of proximity depths.

For example, when a contact touch is performed, that is, when the pointer comes into contact with the touch screen 151, the proximity depth D0 is detected and it is recognized as a contact touch; when the pointer is located within the proximity distance D1 and the proximity depth D0, a proximity touch at the proximity depth D1 is recognized; when the pointer is located between the proximity depth D1 and the proximity depth D2, a proximity touch at the proximity depth D2 is recognized; when the pointer is located within the proximity depth D2 and the proximity depth D3, a proximity touch at the proximity depth D3 is recognized; when the pointer is located at a distance greater than the proximity depth D3, a cancellation of a proximity touch is recognized.

Accordingly, the controller 180 can recognize the proximity touch as proximity input signals according to the proximity distance and proximity position of the pointer with respect to the touch screen 151 and can perform various operations and controls according to the provided proximity input signals.

Embodiments of the prevent invention will now be explained. As described above, the touch screen 151 can execute both an information display function and an information input function. However, the present invention is not limited thereto. It should be understood that the terms "touch" and "contact" as used herein can be a "proximity touch" or a "contact touch" described above.

The memory 160 of the mobile terminal 100 can store image data, such as a map of a city or other location. The image data can be stored in the memory 160 or received from an external apparatus through the radio communication unit 100. For example, if the image data is received from the external apparatus, the image data can be permanently or temporarily stored in the memory 160.

Figure 5:
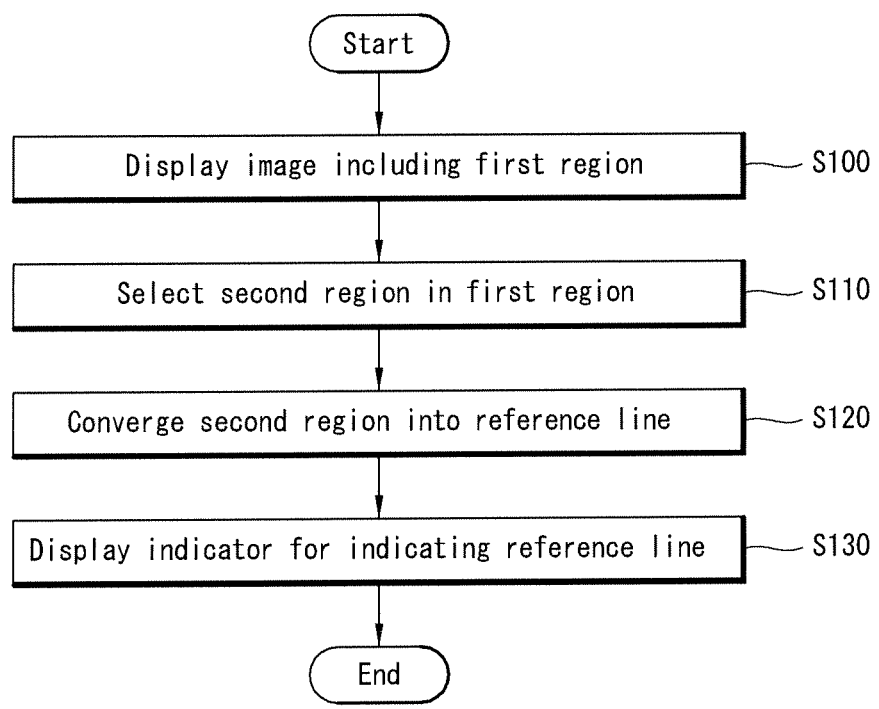
FIG. 5 is a flow chart illustrating a method of displaying image data in a mobile terminal in accordance with one embodiment of the present invention.

FIG. 5 is a flow chart illustrating a method of displaying image data in the mobile terminal 100 in accordance with one embodiment of the present invention.

Figure 6A:
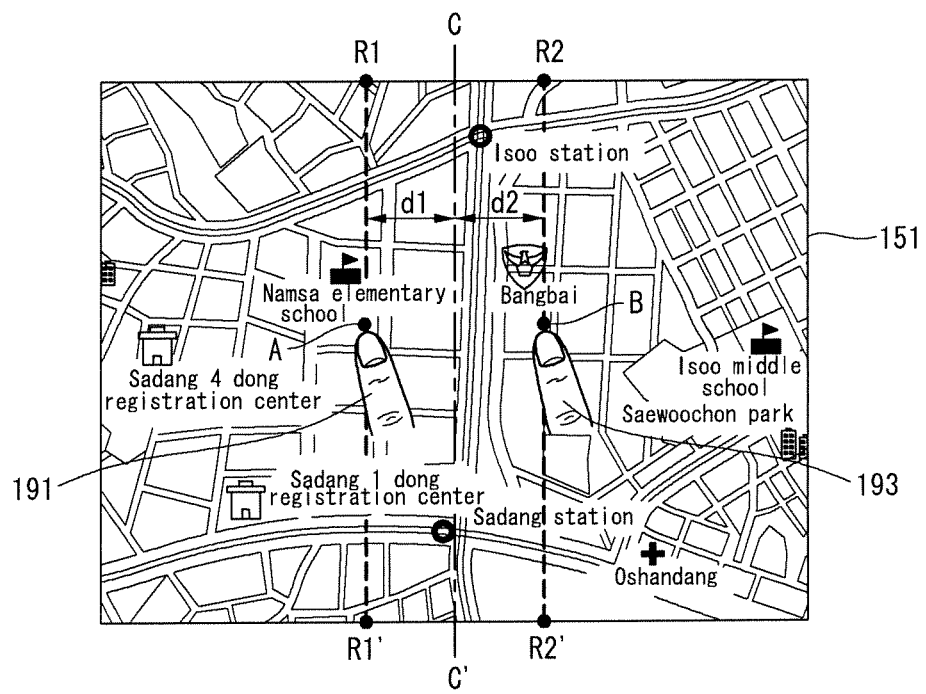
FIGS. 6A-6B illustrate exemplary screens of a mobile terminal in accordance with one embodiment of the invention.

With reference to FIG. 6A, the controller 180 displays image data, such as a map, including a first region on the touch screen 151 (S100). It should be understood that the map displayed in FIG. 6A is provided as an example to facilitate the description herein and that other embodiments of the invention can be configured to display a different map or other image data. The map can be displayed in response to a command initiated by the user via the user input unit 130. For example, the user can operate the user input unit 130 to access a menu of the mobile terminal 100 and to execute a map application for displaying a map.

In one embodiment, the controller 180 can display the map according to a predetermined scale. In another embodiment, the controller 180 can allow a user to control the scale of the map using tools, such as a software application, provided by the controller 180.

The portion of the map occupying the entire display area of the touch screen 151 is herein referred to as a "first region." For example, the portion of the map displayed in FIG. 6A can be referred to as the first region.

After the map is displayed on the display unit 151, a second region, also referred to herein as a "manipulation region," can be selected in the first region (S110). For example, the controller 180 can receive a selection signal for defining a second region in the first region. In one embodiment, and as described below, the second region can be selected by the user using various techniques.

An exemplary selection of a second region included in the first region will now be described with respect to FIG. 6A. For example, as shown in FIG. 6A, the user can select the second region by using the pointer 191 to touch a first point A and by using the pointer 193 to touch a second point B in the first region. The controller 180 can select the second region based on the first point A and the second point B.

As shown in FIG. 6A, the controller 180 selects the second region by determining two preferably straight lines, such as R1-R1' and R2-R2', which are preferably perpendicular to a substantially straight line passing through the first point A and the second point B. The controller 180 can then determine a rectangular region for selecting the second region, where the rectangular region is defined by four points, such as R1, R2, R2' and R1'. In one embodiment, the lines R1-R1' and R2-R2' can be displayed on the touch screen 151 in response to the user's touch. In another embodiment, the lines R1-R1' and R2-R2' can be determined without being displayed on the touch screen 151.

Figure 6B:
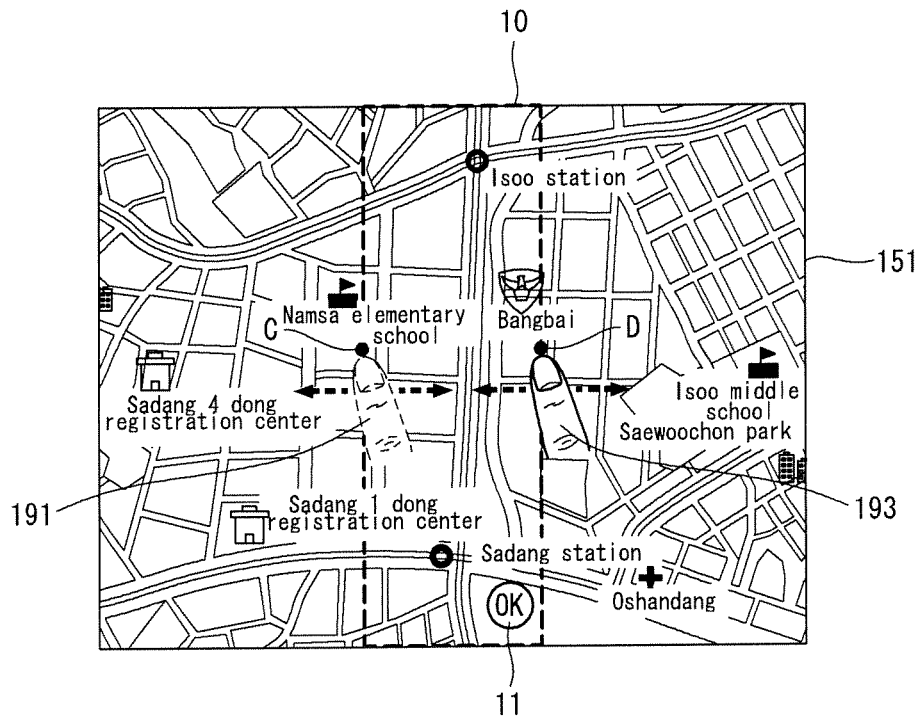

As shown in FIG. 6B, after the rectangular region has been determined, the controller 180 can display an indicator 10 for selecting the second region in the first region displayed in the touch screen 151. In one embodiment, the user can control the indicator 10, that is, the user can adjust the size and location of the indicator 10, to select the second region. For example, the user can use the pointers 191 and 193 to touch various points on the indicator 10, such as points C and D, and can concurrently move the pointers 191 and 193 while touching the points C and D to control the size and/or location of the indicator 10.

After adjusting the size of the indicator 10, the portion of the map within the indicator 10 can be selected by the controller 180 as the second region upon the execution of a command. For example, a command for selecting the second region within the indicator 10 can be executed in response to the user touching an icon displayed in the touch screen 151, such as the "OK" icon 11.

Once the second region has been selected, the controller 180 converges the second region into the reference line C-C', or in other words, removes or compresses the second region, using various techniques (S120).

For example, the reference line C-C' can be a preferably straight line that is located on the boundary of the second region or inside the second region. In one embodiment, the second region can converge into the reference line C-C' and no longer be displayed, as will be discussed with respect to FIGS. 6A, 6B, 7, 8A, 8B, 9A, and 9B. In another embodiment, the second region can be compressed by increasing the scale of the displayed map and then converging the second region into the reference line C-C', as will be discussed with respect to FIGS. 10A, 10B, 10C, and 10D.

The converging of the second region into the reference line C-C' such that the second region is removed and no longer displayed will now be explained with reference to FIG. 6A.

Figure 7:
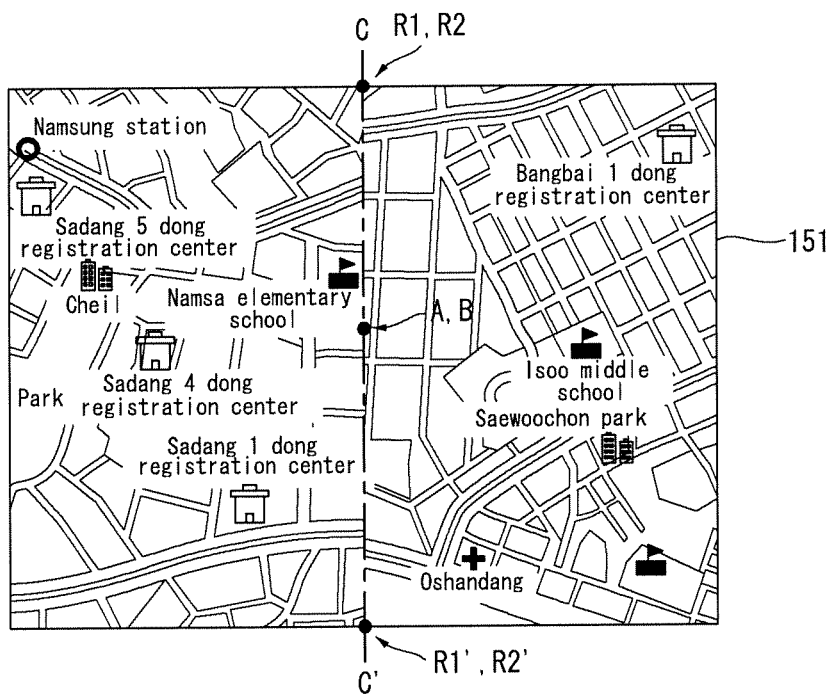
FIG. 7 illustrates an exemplary screen of a mobile terminal in accordance with one embodiment of the invention.

Referring now to FIG. 6A, when the lines R1-R1' and R2-R2' are moved toward the reference line C-C', the second region is converged into the reference line C-C' and is no longer displayed in the touch screen 151. For example, the result of the second region converging into the reference line C-C' is shown in FIG. 7. As discussed below, the converging of the second region into the reference line C-C' can be performed in various manners.

In one embodiment, the controller 180 can be configured to converge the second region into the reference line C-C' upon selection of the second region. For example, when the user touches the first point A using the pointer 191 and touches the second point B using the pointer 193 to select the second region (shown in FIGS. 6A and 6B), the controller 180 can refresh the screen displayed in the touch screen 151 to display the resulting image in a new screen wherein the second region is no longer displayed, as shown in FIG. 7.

In another embodiment, the controller 180 can be configured to converge the second region into the reference line C-C' in response to a user performing a drag operation on at least the first point A or the second point B.

Figure 8A:
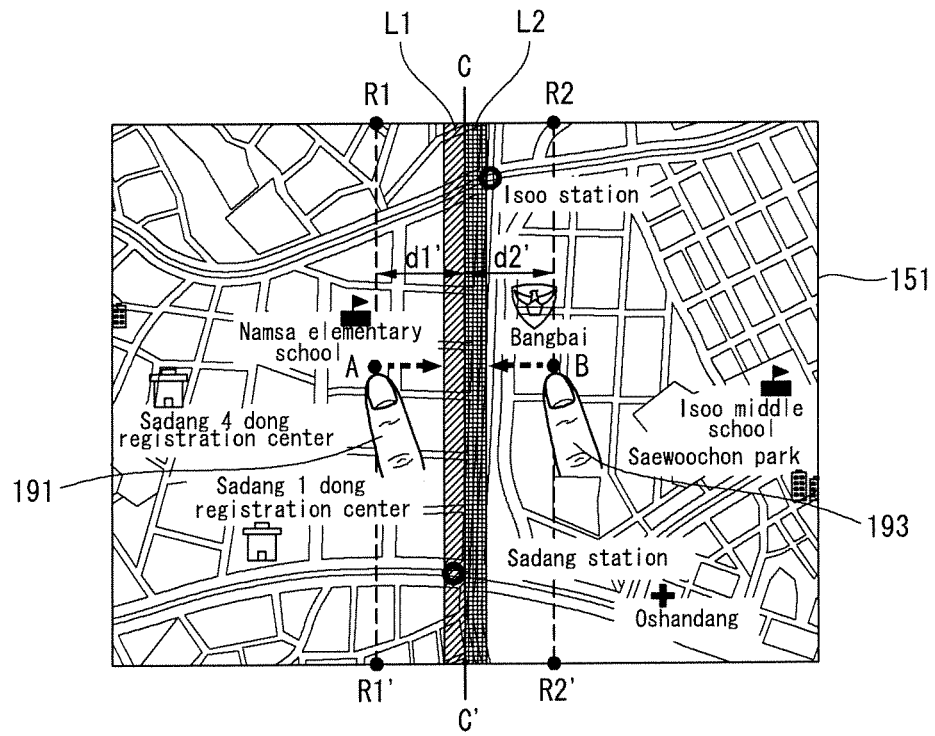
FIGS. 8A-8B illustrate exemplary screens of a mobile terminal in accordance with one embodiment of the invention.
Figure 8B:
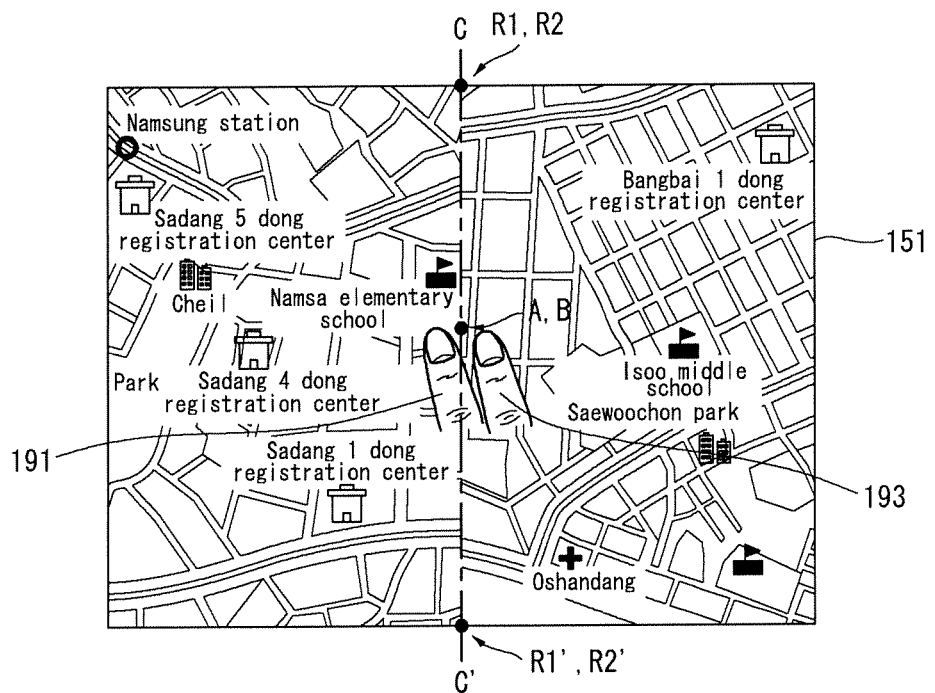
Figure 9A:
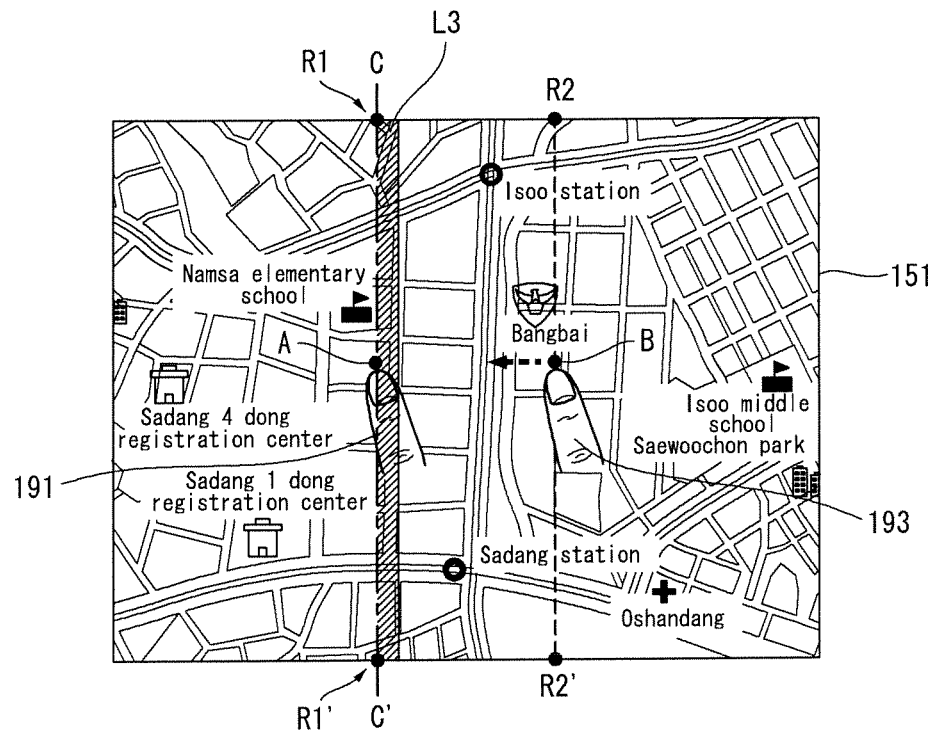
FIGS. 9A-9B illustrate exemplary screens of a mobile terminal in accordance with one embodiment of the invention.
Figure 9B:
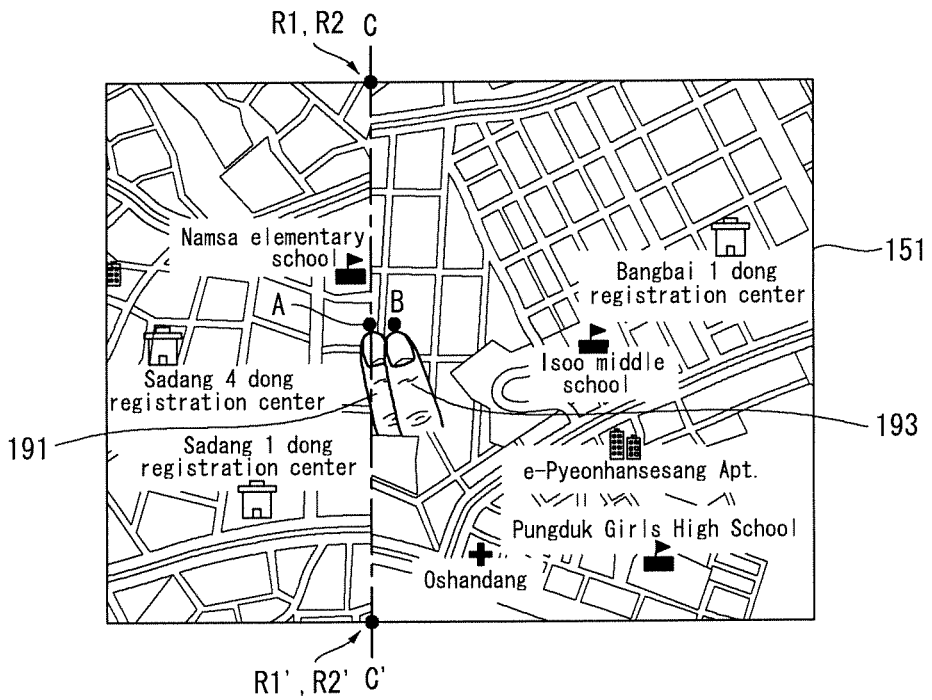

FIGS. 8A and 8B illustrate screens displayed in the touch screen 151 when the first point A and the second point B are touched and dragged by the user, and FIGS. 9A and 9B illustrate screens displayed in the touch screen 151 when the first point A and the second point B are touched by the user, but where only one point, such as point A or point B, is dragged.

For example, with reference to FIG. 8A, the user can touch the first point A using the pointer 191 and the second point B using the pointer 193 and can drag the pointers 191 and 193 toward the reference line C-C' as shown in FIG. 8A. The controller 180 can be configured to no longer display portions of the second region as the user drags the first point A and the second point B toward the reference line C-C'. For example, as the user maintains contact with the first point A and the second point B and drags the first point A and the second point B toward one another, portions L1 and L2 near the reference line C-C' are converged into the reference line C-C' and are no longer displayed. As the user drags the first point A and the second point B toward the reference line C-C', the controller 180 can be configured to scroll portions of the first region into the touch screen 151, while scrolling portions of the second region, such as portions L1 and L2, out of the touch screen 151. For example, the map scale of the remaining portion of the first region can be maintained or varied.

In one embodiment, the size of the portion L1 corresponds to a drag distance d1' of the first point A and the size of the portion L2 corresponds to a drag distance d2' of the second point B. For example, the distance d1' defined between the first point A and the reference line C-C' in FIG. 8A can be substantially equal to the distance d2' defined between the second point B and the reference line C-C'.

For example, the user can command the controller 180 to no longer display the second region in the touch screen 151 using a flicking motion. More specifically, the user may contact the first point A using the pointer 191 and the second point B using the pointer 193 and can perform a flicking motion with at least one of the pointers 191 and 193, such that the second region is no longer displayed by the controller 180 in response to the flicking motion.

As shown in FIG. 8B for example, the user can touch the first point A using the first pointer 191 and the second point B using the a second pointer 193 and can drag the first point A and the second point B toward one another while maintaining contact until the first point A meets the second point B, thereby causing the entirety of the second region to no longer be displayed.

The position of the reference line C-C', such as the reference line C-C' shown in FIG. 8A, can be varied. For example, with reference to FIG. 8A, if the first point A and the second point B are dragged at about the same speed, the distance d1' between the first point A and the reference line C-C' can be equal to the distance d2' between the second point B and the reference line C-C'. However, if the first point A and the second point B are dragged at relatively different speeds, the reference line C-C' may be located closer to the point being dragged at a lower speed.

Referring to FIG. 9A, the user can touch the first point A using the pointer 191 and the second point B using the pointer 193 and can drag the second point B toward the first point A while maintaining contact with the first point A and the second point B. In the embodiment shown in FIG. 9A, the reference line C-C' can be positioned to pass through the first point A.

The controller 180 can be configured to no longer display portions of the second region that converge into the reference line C-C' as the second point B is dragged a distance d3' toward the first point A. In FIG. 9A, the portion L3 represents a portion of the second region that is converged into the reference line C-C' and is no longer displayed as the second point B is dragged a distance d3'. For example, a width of the region L3 can correspond to the distance d3' dragged by the user.

The result of the convergence of the second region into the reference line C-C' as a result of the user dragging the second point B toward the first point A until the first point A and the second point B meet is shown in FIG. 9B.

It should be noted that the position of the reference line C-C' in FIGS. 9A and 9B can be fixed because the first point A is not dragged, whereas in FIGS. 8A and 8B, the position of the reference line C-C' can be variable since the first point A and the second point B are both dragged.

The convergence of a second region into the reference line C-C' where the second region is compressed will now be described with reference to FIGS. 10A, 10B, 10C and 10D in accordance with one embodiment of the present invention.

Figure 10A:
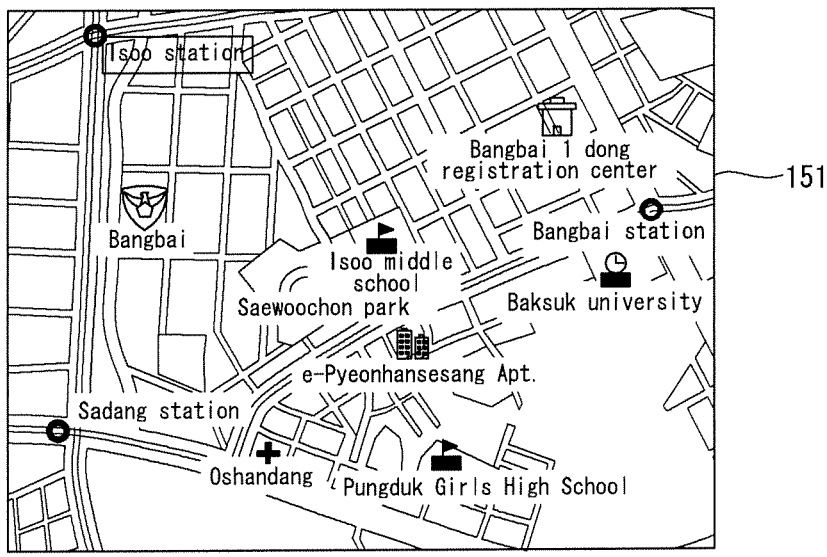
FIGS. 10A-10D illustrate exemplary screens of a mobile terminal in accordance with one embodiment of the invention.
Figure 10B:
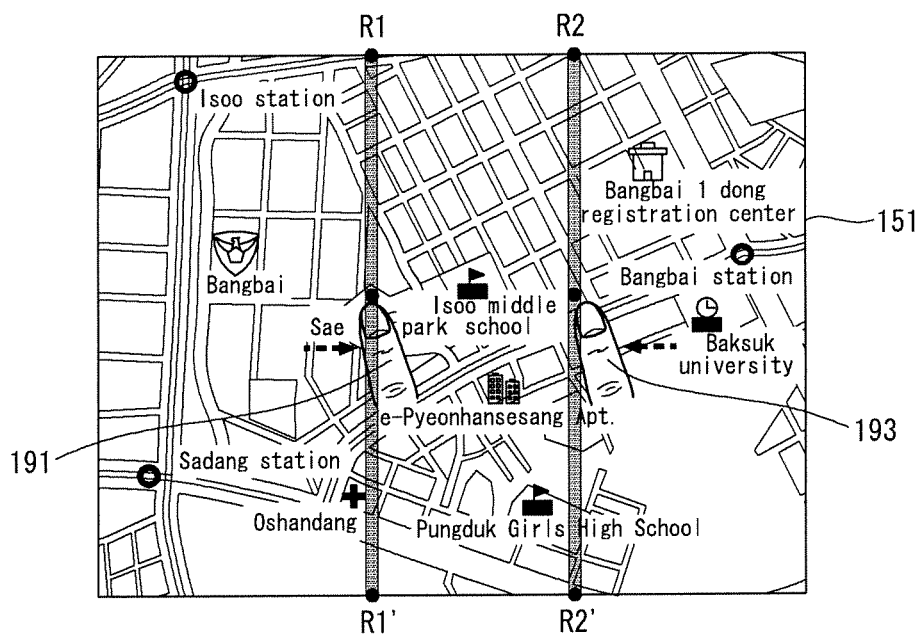

FIG. 10A shows a first region of an image displayed by the controller 180 in the touch display 151. As shown in FIG. 10B, the user can contact the first point A using the pointer 191 and the second point B using the pointer 193 to select the second region defined between lines R1-R1' and R2-R2'. The user can then drag the first point A and the second point B towards one another while maintaining contact with the first point A and the second point B, the result of which is shown in FIG. 10C.

Figure 10C:
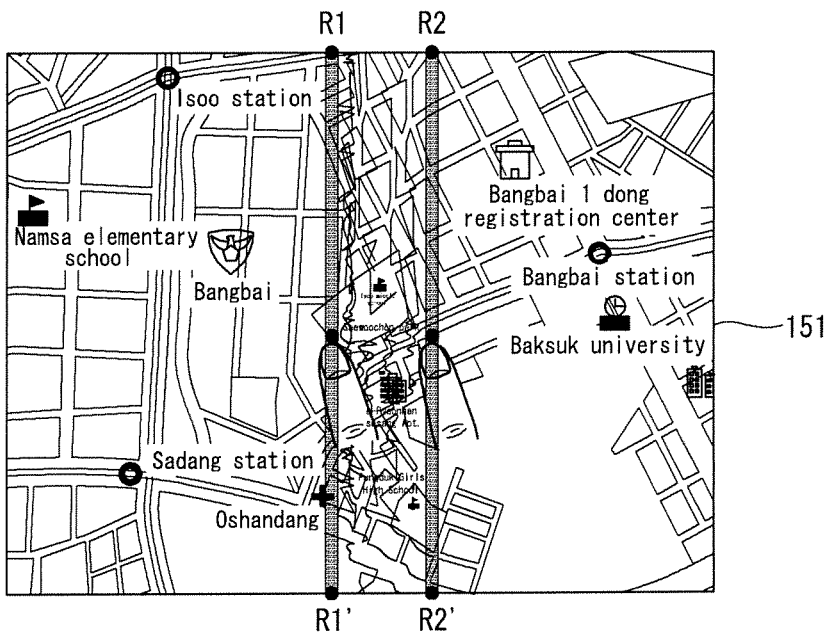

As shown in FIG. 10C, the controller 180 can compress the second region, that is, the controller 180 can increase the map scale of the second region. For example, as the map scale of the second region is increased, the size of the displayed second region is decreased, as shown in FIGS. 10B and 10C. For example, FIG. 10B illustrates a map scale of 1:5000 and FIG. 10C illustrates a map scale of 1:10000. It can be appreciated by those having skill in the art that other embodiments can use various other map scales.

Figure 10D:
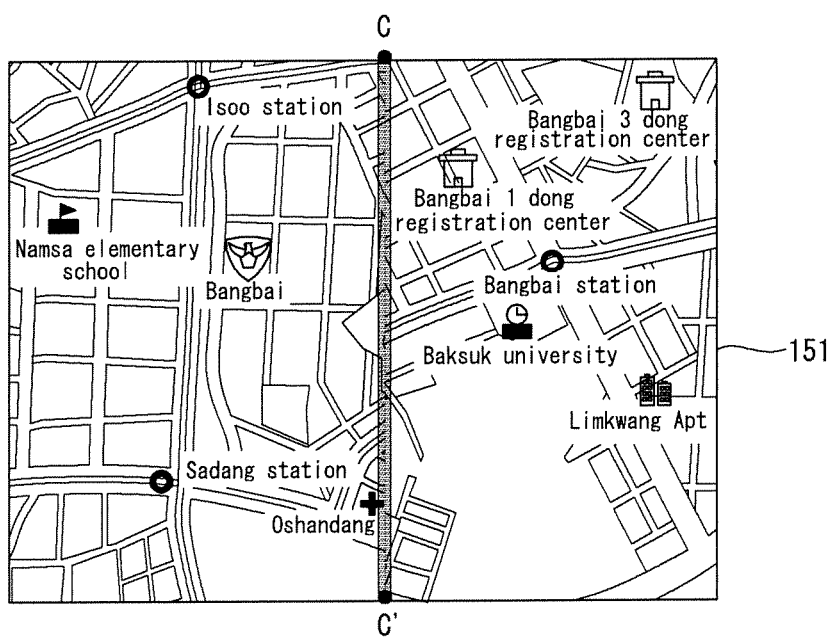

For example, when the first point A and the second point B are brought close together until the first point A meets the second point B, the controller 180 can be configured to no longer display the second region, as shown in FIG. 10D.

As further shown in FIG. 10D, the controller 180 can be configured to display a third map region in the touch screen 151, which includes portions beyond the first region discussed above, after the second region is converged. Thus, the third map region includes portions not included in the first region. Therefore, as portions of the second region are no longer displayed in the touch screen 151 or as the map scale of the second region is increased, portions beyond the first region, that is, the third map region, not initially displayed in the touch screen 151 can be gradually displayed in the touch screen 151.

The third map region can be displayed depending on the manner in which the second region is converged into the reference line C-C'. For example, if the second region is gradually converged into reference line C-C' in a scrolling manner, the third map region can be gradually displayed on the touch screen 151 in a scrolling manner. For example, the controller 180 can control the map scale of the third map region such that the map scale of the third map region corresponds to the map scale of the remaining part of the first region other than the second region.

As shown in FIGS. 11A, 11B, 11C and 11D, the controller 180 of the mobile terminal 100 can be configured to display various indicators, such as exemplary indicators 12a, 12b, 12c, 12d and 12e, for indicating the reference line C-C' (S130). It should be noted that the reference line C-C' can also be displayed in operations S110 and S120 shown in FIG. 5.

Figure 11A:
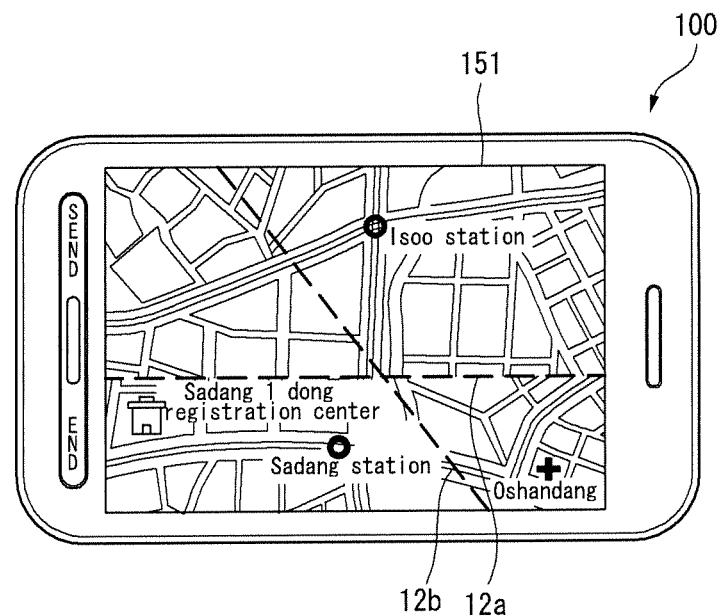
FIGS. 11A-11D illustrate exemplary screens of a mobile terminal in accordance with one embodiment of the invention.
Figure 11B:
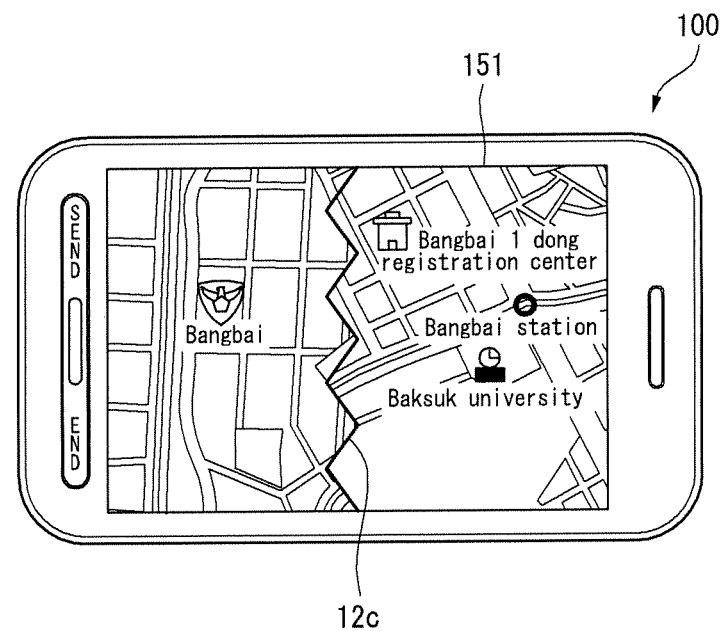
Figure 11C:
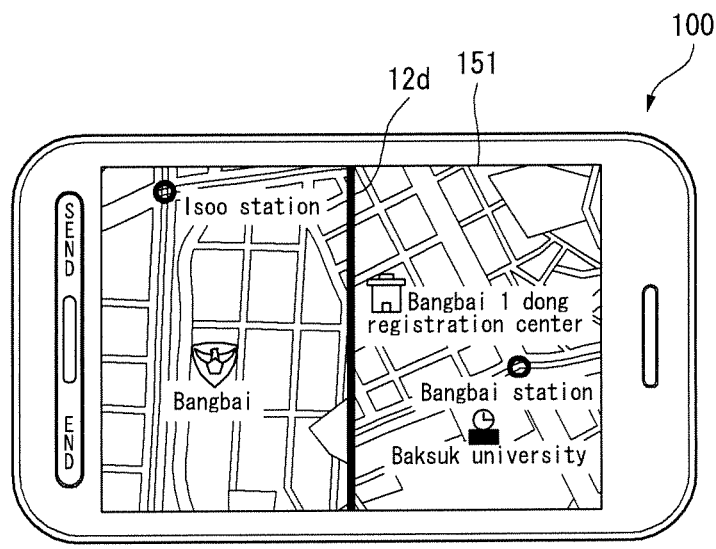
Figure 11D:
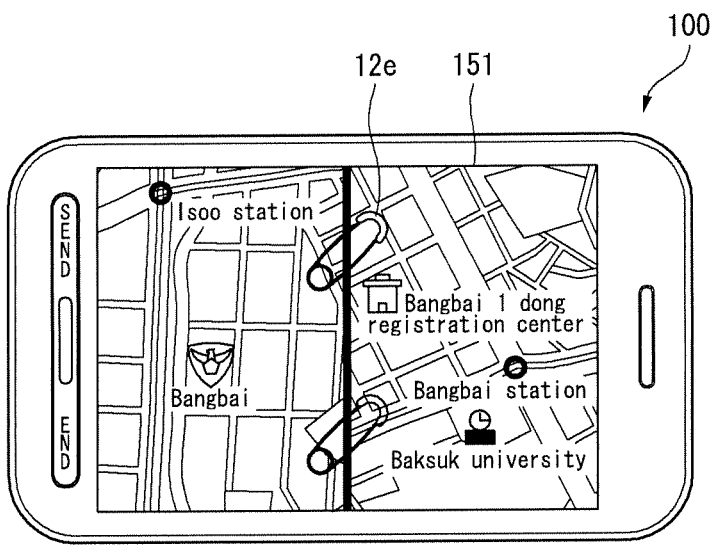

In the embodiment of FIG. 11A, multiple reference lines, such as reference lines 12a and 12b, are displayed. The multiple reference lines can be achieved by repeatedly performing operations S110 and S120 in FIG. 5. More specifically, the user can converge a portion of a map displayed on the touch screen 151 into a first reference line, such as reference line 12a, and can converge another portion of the map into a second reference line, such as reference line 12b.

Figure 12:
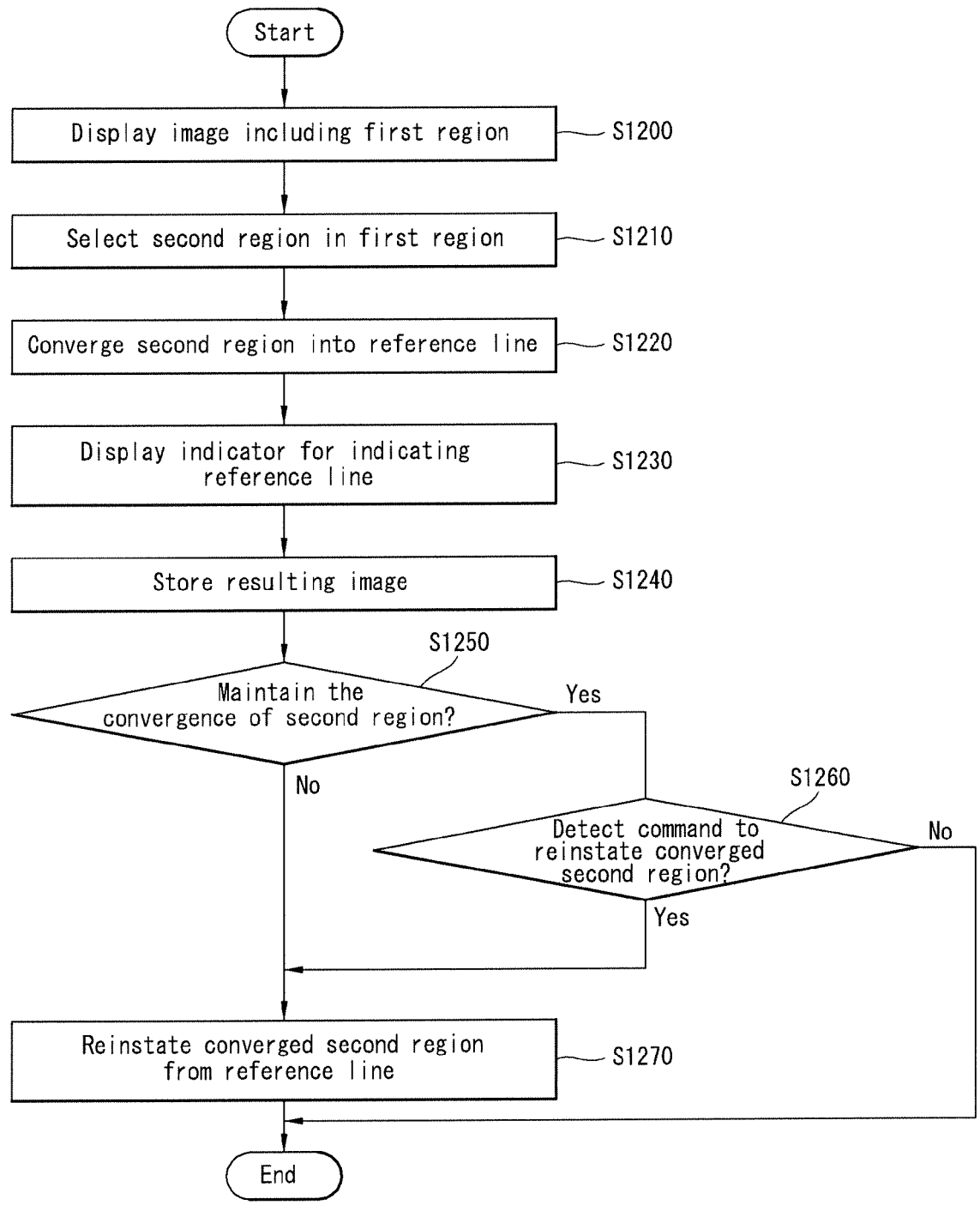
FIG. 12 is a flow chart illustrating a method of displaying a image data in a mobile terminal in accordance with one embodiment of the present invention.

FIG. 12 is a flow chart illustrating a method of displaying a map in the mobile terminal 100 in accordance with one embodiment of the present invention.

Operations S1200 through S1230 in the flow chart of FIG. 12 correspond respectively to the operations S100 through S130 in the flow chart of FIG. 5. Therefore, operations S1200 through S1230 will not be described herein to maintain brevity.

With reference to FIG. 12, the controller 180 can be configured to store the image, such as a map, displayed in the touch screen 151 (S1240) following operations S1200 through S1230 in the memory 160 in response to a command provided by the user or a stored command.

After the displayed map is stored (S1240), the controller 180 can then determine whether the convergence of the second region into the reference line C-C' is to be maintained (S1250).

The determination whether to maintain the convergence of the second region can be based on various conditions. For example, the controller 180 can be preconfigured to automatically maintain the convergence of the second region each time the operation S1230 is performed. Alternatively, the controller 180 can be preconfigured to reinstate, that is, to cancel, the convergence of the second region if the controller 180 does not detect a command to maintain the converged second region within a predetermined time.

For example, the user can operate the map displayed in the touch screen 151 after the second region has been converged into the reference line C-C' to maintain or cancel the convergence of the second region. The exemplary screens in FIGS. 13A and 13B show the result of the control operations performed by the user for maintaining the convergence of the second region, which are described in greater detail below.

Figure 13A:
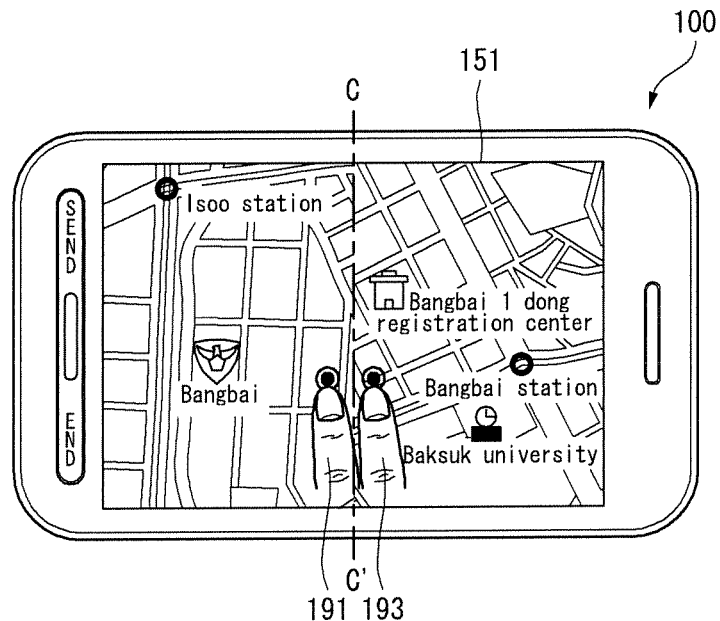
FIGS. 13A-13B illustrate exemplary screens of a mobile terminal in accordance with one embodiment of the invention.
Figure 13B:
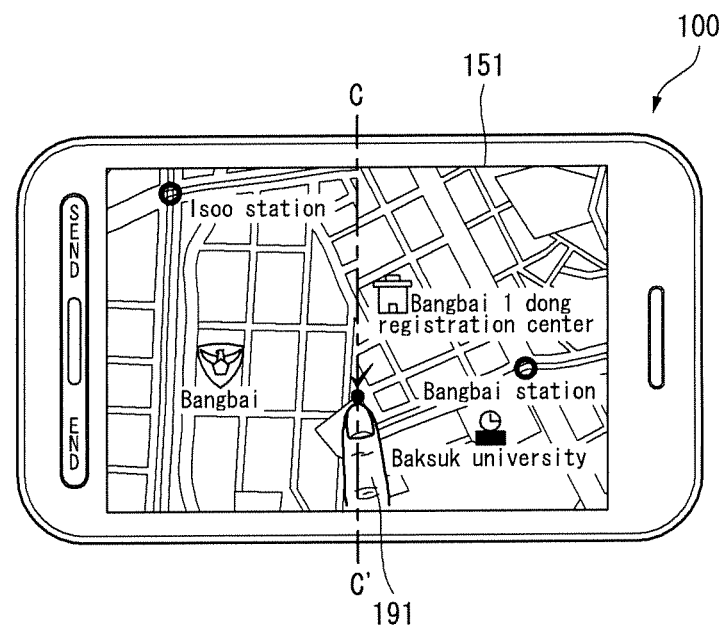

As shown in FIG. 13A, the user can touch one or more arbitrary points near the reference line C-C' using the pointers 191 and 193, or on the reference line C-C' as shown in FIG. 13B, multiple times within a predetermined time period after the second region is completely converged into the reference line C-C' (S1220) to maintain the convergence of the second region.

The controller 180 can detect a command provided by the user to reinstate the converged second region (S1260) if the convergence of the second region is to be maintained (S1250). Therefore, the controller 180 can reinstate the converged second region from the reference line C-C' (S1270) if a cancellation of the convergence of the second region is required as a result of the determination in operation S1250 or if the controller 180 detects a command provided by the user to reinstate the converged second region (S1260).

The controller 180 reinstates the converged second region by returning the image, that is, the first portion, to the state prior to the convergence. In one embodiment, the controller 180 can gradually reinstate the second region, thereby allowing the user to observe the reinstatement, or can reinstate the second region by refreshing the screen displayed in the touch screen 151, thereby not allowing the user to observe the reinstatement.

If the determination in operation S1250 does not require maintaining the convergence of the second region, the controller 180 can reinstate the converged second region from the reference line C-C' (S1270), even if the command for reinstating the second region is not detected by the controller 180 (S1260).

The detection of the command provided by the user to reinstate the converged second region (S1260), that is, to cancel the convergence of the second region, and the reinstatement of the converged second region (S1270) will now be described.

Figure 14A:
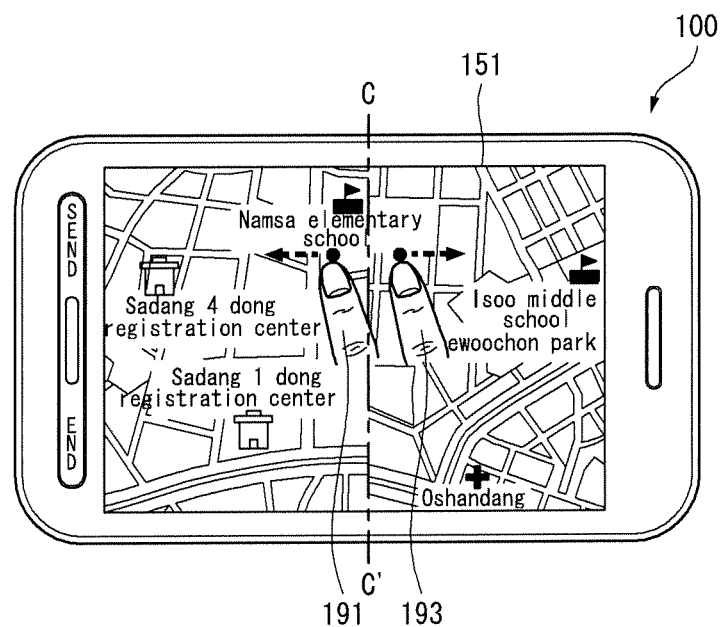
FIGS. 14A-14B illustrate exemplary screens of a mobile terminal in accordance with one embodiment of the invention.
Figure 14B:
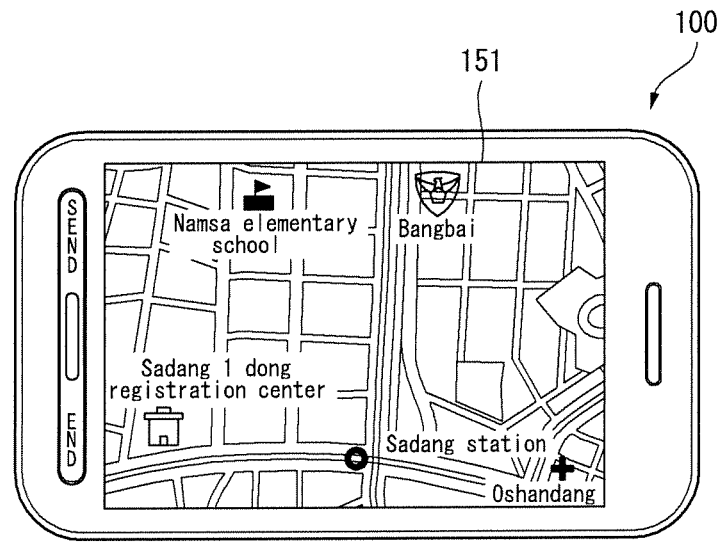

FIGS. 14A and 14B show an exemplary reinstatement operation for canceling the convergence of the second region shown in FIGS. 8A and 8B, and FIGS. 15A and 15B show an exemplary reinstatement operation for canceling the convergence of the second region shown in FIGS. 9A and 9B.

For example, with reference to FIG. 14A, when the user contacts two arbitrary points located on opposite sides of the reference line C-C' using the pointers 191 and 193 and drags the points apart from one another while maintaining contact, the second region is gradually reinstated from the reference line C-C'. For example, and as shown in FIG. 14B, as the user increasingly spreads the pointers 191 and 193 and consequently the two arbitrary points further apart, the map is returned to the state wherein discontinuous portions are not included in the map and the second region is no longer converged.

Figure 15A:
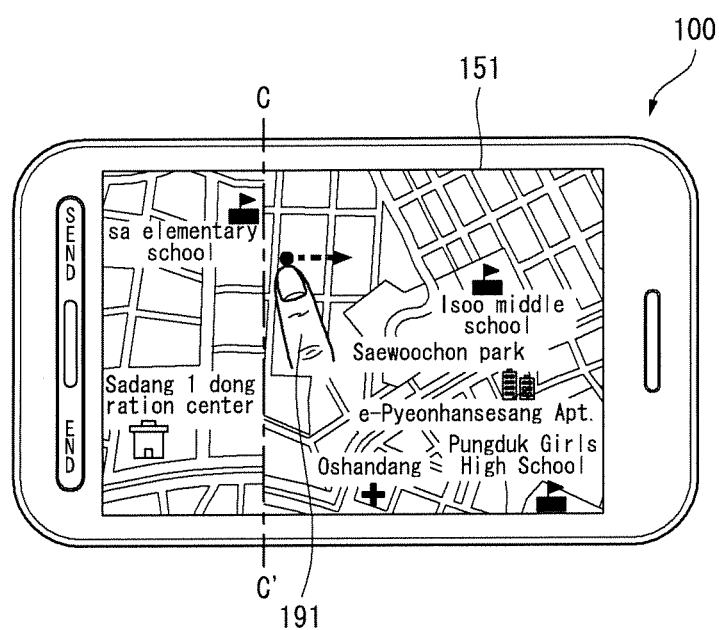
FIGS. 15A-15B illustrate exemplary screens of a mobile terminal in accordance with one embodiment of the invention.
Figure 15B:
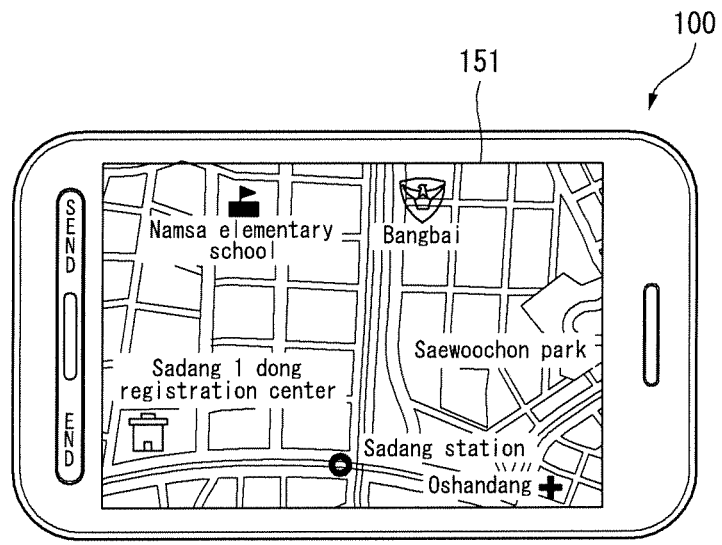

For example, with reference to FIG. 15A, when the user contacts an arbitrary point located at one side of the reference line C-C' with the pointer 191 and then drags the point while maintaining contact such that the point is moved away from the reference line C-C', the second region is gradually reinstated from the reference line C-C'. As shown in FIG. 15B, the map is completely returned to the initial state and thus, the second region is no longer converged and is displayed.

Figure 16A:
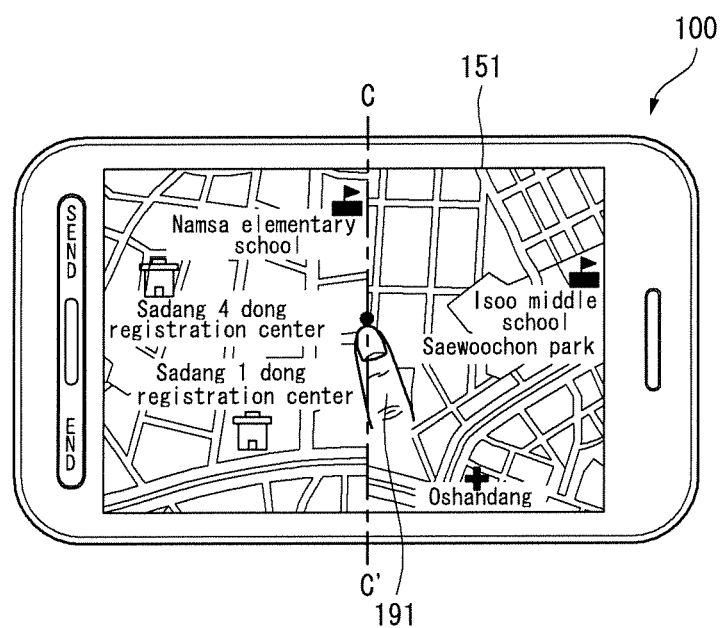
FIGS. 16A-16B illustrate exemplary screens of a mobile terminal in accordance with one embodiment of the invention.
Figure 16B:
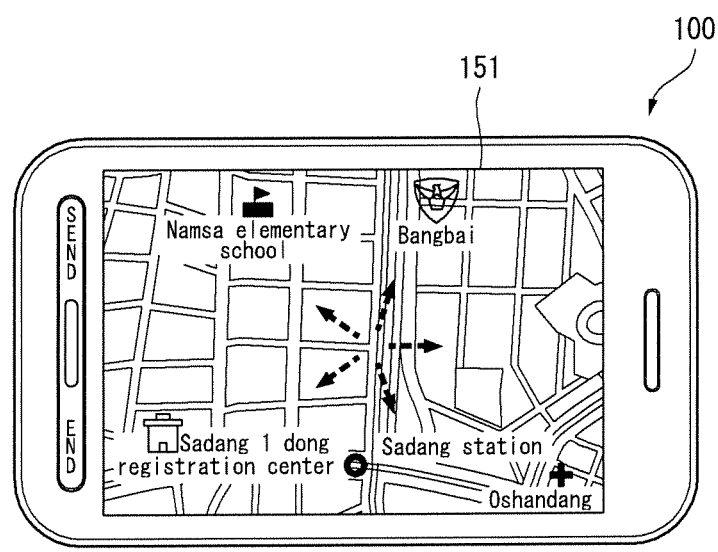

For example, with reference to FIGS. 16A and 16B, when the user contacts an arbitrary point on the reference line C-C' multiple times within a predetermined time period using the pointer 191, the converged second region is reinstated and returned to the initial state, and thus the second region is no longer converged and is displayed.

While the display unit 151 is implemented as a touch screen in the aforementioned embodiments, the present invention is not limited thereto. Various input units other than the touch screen can be provided to the user to implement the present invention.

While the present invention has been particularly shown and described with reference to exemplary embodiments thereof, it can be appreciated by those of ordinary skill in the art that various changes in form and details may be made without departing from the spirit and scope of the present invention as defined by the following claims.

In the present description, the terms "module" and "unit" are merely used herein to facilitate description of the components of the mobile terminal 100 and do not have any unique meaning per se. Accordingly, the terms "module" and "unit" are used interchangeably herein.

The mobile terminal 100 described in the specification can include a cellular phone, a smart phone, a laptop computer, a digital broadcasting terminal, personal digital assistants (PDA), a portable multimedia player (PMP), or a navigation system.

Depending on the type of implementation, it is possible that the present invention can take the form of an entirely hardware embodiment, an entirely software embodiment or an embodiment containing both hardware and software elements. A software embodiment may include, but not be limited to, firmware, resident software, or microcode.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

What is claimed is:

1. A wireless communication terminal, comprising:
a touch screen configured to display information and recognize received touch input;
a memory configured to store image data; and
a controller configured to:
communicate with the memory and the touch screen;
control the touch screen to display at least a portion of an image having a first scale;
recognize a first touch input received via the touch screen to define a manipulation region associated with a defined reference line associated with the displayed at least a portion of the image;
control the touch screen to gradually remove a portion of the at least a portion of the image in the manipulation region into the reference line or gradually reinstate a portion of the at least a portion of the image in the manipulation region from the reference line in response to a detected movement of the first touch input relative to the reference line while maintaining the first scale of the at least a portion of the image that is displayed outside of the manipulation region; and
control the touch screen to scroll portions of the image not displayed on the touch screen prior to the gradual removal of the portion of the at least a portion of the image in the manipulation region into the reference line to be displayed on the touch screen in response to the gradual removal of the portion of the at least a portion of the image in the manipulation region into the reference line or to scroll portions of the image displayed on the touch screen in response to the gradual removal of the portion of the at least a portion of the image in the manipulation region into the reference line to remove from the touch screen in response to the reinstating of the portion of the at least a portion of the image in the manipulation region from the reference line.

2. The wireless communication terminal of claim 1, wherein the controller is further configured to control the touch screen to display a contiguous portion of the at least a portion of the image having the first scale while the image in the manipulation region is being removed.

3. The wireless communication terminal of claim 1, wherein the controller is further configured to recognize a second touch input to alter the at least a portion of the image in the manipulation region in response to the movement of both the first touch input and second touch input relative to the reference line.

4. The wireless communication terminal of claim 1, wherein the manipulation region is determined by a user defined boundary.

5. The wireless communication terminal of claim 4, wherein the user defined boundary comprises a rectangle.

6. The wireless communication terminal of claim 1, wherein the controller is further configured to cease defining the manipulation region based on a first command provided by a user or a second command stored in the memory.

7. The wireless communication terminal of claim 1, wherein the image data comprises an image of a map.

8. The wireless communication terminal of claim 1, wherein the received touch input comprises a proximity touch or a contact touch on the touch screen by a pointer.

9. The wireless communication terminal of claim 8, wherein the pointer is a stylus or a finger.

10. The wireless communication terminal of claim 1, wherein the controller is further configured to control the touch screen to display the reference line upon recognizing the first touch input.

11. The wireless communication terminal of claim 1, wherein the reference line is not displayed on the touch screen.

12. A wireless communication terminal, comprising:
   a touch screen configured to display information and recognize received touch input;
   a memory configured to store image data; and
   a controller configured to:
      communicate with the memory and the touch screen;
      control the touch screen to display at least a portion of an image having a first scale;
      recognize a first touch input received via the touch screen to define a manipulation region associated with a defined reference line associated with the displayed at least a portion of the image;
      control the touch screen to gradually compress or expand a portion of the at least a portion of the image in the manipulation region in response to a detected movement of the first touch input relative to the reference line while maintaining the first scale of the at least a portion of the image that is displayed outside of the manipulation region; and
      control the touch screen to scroll portions of the image not displayed on the touch screen prior to the gradual compression of the portion of the at least a portion of the image in the manipulation region to be displayed on the touch screen in response to the gradual compression of the portion of the at least a portion of the image in the manipulation region or to scroll portions of the image displayed on the touch screen in response to the gradual compression of the portion of the at least a portion of the image in the manipulation region to remove from the touch screen in response to the expansion of the portion of the at least a portion of the image in the manipulation region.

13. The wireless communication terminal of claim 12, wherein the controller is further configured to control the touch screen to remove the portion of the at least a portion of the image that is displayed in the manipulation region when the first touch input is in close proximity to the reference line.

14. The wireless communication terminal of claim 12, wherein the controller is further configured to control the touch screen to display a contiguous portion of the at least a portion of the image having the first scale while the image in the manipulation region is being compressed.

15. The wireless communication terminal of claim 12, wherein the controller is further configured to recognize a second touch input to alter the at least a portion of the image in the manipulation region in response to the movement of both the first touch input and second touch input relative to the reference line.

16. The wireless communication terminal of claim 12, wherein the manipulation region is determined by a user defined boundary.

17. The wireless communication terminal of claim 16, wherein the user defined boundary comprises a rectangle.

18. The wireless communication terminal of claim 12, wherein the controller is further configured to cease defining the manipulation region based on a first command provided by a user or a second command stored in the memory.

19. The wireless communication terminal of claim 12, wherein the image data comprises an image of a map.

20. The wireless communication terminal of claim 12, wherein the received touch input comprises a proximity touch or a contact touch on the touch screen by a pointer.

21. The wireless communication terminal of claim 20, wherein the pointer is a stylus or a finger.

22. A method of displaying an image on a touch screen of a wireless communication terminal, the method comprising:
   displaying at least a portion of the image having a first scale on the touch screen;
   recognizing a touch input received via the touch screen to define a manipulation region associated a defined reference line associated with the displayed at least a portion of the image;
   gradually removing a portion of the at least a portion of the image within the manipulation region into the reference line or gradually reinstating a portion of the at least a portion of the image within the manipulation region from the reference line in response to a detected movement of the first touch input relative to the reference line while maintaining the first scale of the at least a portion of the image that is displayed outside of the manipulation region; and
   scrolling portions of the image not displayed on the touch screen prior to the gradual removal of the portion of the at least a portion of the image in the manipulation region into the reference line to be displayed on the touch screen in response to the gradual removal of the portion of the at least a portion of the image in the manipulation region into the reference line or scrolling portions of the image displayed on the touch screen in response to the gradual removal of the portion of the at least a portion of the image in the manipulation region into the reference line to remove from the touch screen in response to the reinstating of the portion of the at least a portion of the image in the manipulation region from the reference line.

23. The method of claim 22, further comprising displaying an indicator for indicating the reference line on the touch screen.

24. The method of claim 22, further comprising storing a resultant image after gradually removing or gradually reinstating the portion of the at least a portion of the image within the manipulation region.

25. The method of claim 22, further comprising:
   determining whether to maintain the removing of the portion of the at least a portion of the image within the manipulation region; and
   reinstating the portion of the at least a portion of the image within the manipulation region based on the determination.

26. The method of claim 22, further comprising:
- detecting a command for reinstating the portion of the at least a portion of the image within the manipulation region; and
- reinstating the portion of the image within the manipulation region based on the detection.

27. A method of displaying an image on a touch screen of a wireless communication terminal, the method comprising:
- displaying at least a portion of the image having a first scale on the touch screen;
- recognizing a touch input received via the touch screen to define a manipulation region in the portion of the image associated with a defined reference line associated with the displayed at least a portion of the image;
- gradually compressing or gradually expanding a portion of the at least a portion of the image within the manipulation region in response to a detected movement of the first touch input relative to the reference line while maintaining the first scale of the at least a portion of the image that is displayed outside the manipulation region; and
- scrolling portions of the image not displayed on the touch screen prior to the gradual compression of the portion of the at least a portion of the image in the manipulation region to be displayed on the touch screen in response to the gradual compression of the portion of the at least a portion of the image in the manipulation region or to scrolling portions of the image displayed on the touch screen in response to the gradual compression of the portion of the at least a portion of the image in the manipulation region to remove from the touch screen in response to the expansion of the portion of the at least a portion of the image in the manipulation region.

28. The method of claim 27, further comprising displaying an indicator for indicating the reference line on the touch screen.

29. The method of claim 27, further comprising storing a resultant image after gradually compressing or gradually expanding the portion of the at least a portion of the image within the manipulation region.

30. The method of claim 27, further comprising:
- determining whether to maintain the compressing or expanding of the portion of the at least a portion of the image within the manipulation region; and
- expanding the portion of the at least a portion of the image within the manipulation region based on the determination.

31. The method of claim 27, further comprising:
- detecting a command for expanding the portion of the at least a portion of the image within the manipulation region; and
- expanding the portion of the image within the manipulation region based on the detection.

* * * * *